(12) United States Patent
Miyazaki et al.

(10) Patent No.: US 9,698,610 B2
(45) Date of Patent: Jul. 4, 2017

(54) CHARGE AND DISCHARGE CONTROL METHOD, CHARGE AND DISCHARGE CONTROL SYSTEM, AND CHARGE AND DISCHARGE CONTROL APPARATUS

(71) Applicant: Panasonic Corporation, Osaka (JP)

(72) Inventors: Seiya Miyazaki, Hyogo (JP); Takahiro Kudoh, Kyoto (JP)

(73) Assignee: Panasonic Corporation, Osaka (JP)

( * ) Notice: Subject to any disclaimer, the term of this patent is extended or adjusted under 35 U.S.C. 154(b) by 333 days.

(21) Appl. No.: 14/372,032

(22) PCT Filed: Nov. 28, 2013

(86) PCT No.: PCT/JP2013/006995
§ 371 (c)(1),
(2) Date: Jul. 14, 2014

(87) PCT Pub. No.: WO2014/091700
PCT Pub. Date: Jun. 19, 2014

(65) Prior Publication Data
US 2014/0354239 A1    Dec. 4, 2014

(30) Foreign Application Priority Data

Dec. 14, 2012  (JP) ................. 2012-274028

(51) Int. Cl.
*H02J 7/00* (2006.01)
*H02J 3/32* (2006.01)
*H02J 7/04* (2006.01)

(52) U.S. Cl.
CPC  *H02J 7/00* (2013.01); *H02J 3/32* (2013.01); *H02J 7/045* (2013.01)

(58) Field of Classification Search
CPC ...................................................... G01R 31/36
See application file for complete search history.

(56) References Cited

U.S. PATENT DOCUMENTS

| 8,471,528 B2 | 6/2013 | Toba et al. | |
| 9,035,493 B2 * | 5/2015 | Arata | H02J 3/32 307/46 |

(Continued)

FOREIGN PATENT DOCUMENTS

| JP | 2010-041802 | 2/2010 |
| JP | 2011-200084 | 10/2011 |

(Continued)

OTHER PUBLICATIONS

Okuma, Shigeo, JP 2012065378, Mar. 2012 Charge Control Unit.*
International Search Report issued Feb. 10, 2014 in International (PCT) Application No. PCT/JP2013/006995.

*Primary Examiner* — Drew A Dunn
*Assistant Examiner* — Tynese McDaniel
(74) *Attorney, Agent, or Firm* — Wenderoth, Lind & Ponack, L.L.P.

(57) ABSTRACT

A charge or discharge control method includes: receiving a power instruction value with respect to a power storage apparatus; obtaining a remaining state of charge (SOC) and a target SOC which is a target value of the SOC of the power storage apparatus; controlling charge or discharge of the power storage apparatus according to the power instruction value when the power instruction value is received; wherein, in the controlling, a delay time is determined according to a difference between the target SOC and the remaining SOC, and the power storage apparatus is controlled according to the power instruction value at a timing when the delay time passes after the power instruction value is received.

2 Claims, 18 Drawing Sheets

(56) References Cited

U.S. PATENT DOCUMENTS

| | | | | |
|---|---|---|---|---|
| 2010/0187907 A1* | 7/2010 | Toba | ............ | H02J 3/32 |
| | | | | 307/48 |
| 2010/0308857 A1* | 12/2010 | Saniter | ............ | H02P 9/102 |
| | | | | 324/764.01 |
| 2011/0175571 A1* | 7/2011 | Renken | ............ | H02J 7/0078 |
| | | | | 320/112 |
| 2011/0257803 A1 | 10/2011 | Yamamoto et al. | | |
| 2011/0313613 A1* | 12/2011 | Kawahara | ............ | H01M 10/441 |
| | | | | 701/34.4 |
| 2011/0316520 A1* | 12/2011 | Kawahara | ............ | B60L 3/0046 |
| | | | | 323/351 |
| 2014/0077769 A1* | 3/2014 | Maleki | ............ | H02J 7/008 |
| | | | | 320/136 |

FOREIGN PATENT DOCUMENTS

| | | |
|---|---|---|
| JP | 2011-229238 | 11/2011 |
| JP | 2011-234563 | 11/2011 |
| JP | 2012-065378 | 3/2012 |
| JP | 2012065378 A * | 3/2012 |
| WO | 2012/057305 | 5/2012 |
| WO | 2012/081174 | 6/2012 |

\* cited by examiner

CHARGE AND DISCHARGE CONTROL METHOD, CHARGE AND DISCHARGE CONTROL SYSTEM, AND CHARGE AND DISCHARGE CONTROL APPARATUS

TECHNICAL FIELD

The present invention relates to a charge or discharge control method of a power storage apparatus to be used in stabilization control of a grid.

BACKGROUND ART

As one of the stabilization controls of a grid, frequency regulation which keeps the frequency of the grid within a predetermined range is known. The frequency regulation is a control method of keeping the frequency of the grid within a predetermined range by increasing the output of a power generator which provides power to the power system when the frequency of the grid is lower than the reference frequency, and by decreasing the output of a power generator which provides power to the power system when the frequency of the grid is higher than the reference frequency.

When a power system operator, and a power service provider which has a power generator such as a gas turbine and a steam turbine are different from each other, a method is performed in which the power system operator calculates a power instruction for frequency regulation and the power service provider performs frequency regulation by controlling the output of the power generator based on the instruction.

Recent years have seen the practical use of large-scale power storage apparatuses using a secondary battery or a flywheel capacitor. Although these power storage apparatuses have a relatively small output, they are capable of responding to an output instruction faster and more correctly than the conventional power generation apparatus. In view of this, these power storage apparatuses are expected to stabilize a change in short period frequency of the power system within 10 minutes.

Already in the United States and the like, there is a market which operates power storage apparatuses owned by power service providers through bids. Through the market, the stabilization of the power grid is realized. Moreover, this market introduces a mechanism in which when an apparatus has a higher responsiveness of the output to a power instruction value, a higher incentive is provided.

Different from the power generation apparatus, the power storage apparatus discharges from the power storage apparatus to the grid when the frequency of the grid decreases, and charges from the grid to the power storage apparatus when the frequency of the grid increases. Here, generally, in the frequency regulation, a power value of the power to be charged and discharged by the power storage apparatus is determined by a power instruction value which is transmitted from the power system operator to the power storage apparatus in a period of several seconds, and the power instruction value is determined by the power system operator.

In view of this, the power storage apparatus needs to previously store electricity in order to discharge according to the power instruction value. The power storage apparatus needs to previously secure an electric storage capacity in order to charge according to the power instruction value.

In the frequency regulation, however, there is a case where the power storage apparatus cannot continue charge or discharge when performing charge or discharge according to the power instruction value (for example, Patent Literature 1).

For example, when an average of the power instruction value over a medium to long-term period from the power system operator is ±0, the state of charge (SOC) after the end of the frequency regulation should almost match with the SOC at the start of the frequency regulation. At this time, however, since a power conversion loss and the like occur in an inverter and the like when charge or discharge of power is performed, a discharge amount of the power storage apparatus is larger than a charge amount of the power storage apparatus over a medium to long-term period. In other words, when the power storage apparatus is charged and discharged according to the power instruction value, the SOC decreases as time passes. This means that the power storage apparatus is not able to continue charge or discharge.

CITATION LIST

Patent Literature

[PTL 1]
Japanese Unexamined Patent Application Publication No. 2011-200084

SUMMARY OF INVENTION

Technical Problem

As described above, there is a problem that when, in the stabilization control of the grid, the power storage apparatus is controlled according to the power instruction value, the stabilization control cannot be continued because the most appropriate SOC cannot be maintained.

The present invention solves the above described problem, and provides a charge or discharge control method which makes it possible to secure responsiveness of the output of the power storage apparatus to the power instruction value, and control the SOC of the power storage apparatus.

Solution to Problem

In order to solve the above described problem, a charge or discharge control method according to an aspect of the present invention is a charge or discharge control method for performing stabilization control of a grid by causing a power storage apparatus connected to the grid to charge or discharge, the charge or discharge control method including: receiving, in a period of the stabilization control, a power instruction value indicating a power value of power which the power storage apparatus is to charge or discharge; obtaining a remaining state of charge (SOC) of the power storage apparatus; obtaining a target SOC which is a target value of the SOC of the power storage apparatus; and controlling charge or discharge of the power storage apparatus according to the power instruction value, when the power instruction value is received, wherein, in the controlling, where a delay time from when the power instruction value is received to when the power storage apparatus is caused to charge or discharge according to the power instruction value is determined according to a difference between the target SOC and the remaining SOC, (i) when the remaining SOC is smaller than the target SOC, the delay time is set, in a period in which the power instruction value increases as time passes, from when the power instruction value is received to when the power storage apparatus is caused to charge or discharge according to the power instruction value, and (ii) when the remaining SOC is larger than the target SOC, the delay time is set, in a period in which the power instruction value decreases as time passes, from when the power instruction value is received to when the power storage apparatus is caused to charge or discharge according to the power instruction value.

It should be noted that these general and specific aspects may be implemented using a system, an apparatus, an integrated circuit, a computer program, or a computer-readable recording medium such as a CD-ROM, or any combination of systems, apparatuses, integrated circuits, computer programs, or computer-readable recording media.

Advantageous Effects of Invention

With the charge or discharge method according to the present invention, it is possible to secure responsiveness of the output of the power storage apparatus to the power instruction value, and control the SOC of the power storage apparatus.

DESCRIPTION OF EMBODIMENTS (Underlying Knowledge Forming Basis of the Present Invention)

As described in the Background Art section, in the frequency regulation of a grid, there is a case where the power storage apparatus cannot continue charge or discharge when performing charge or discharge according to the power instruction value.

Figure 1:
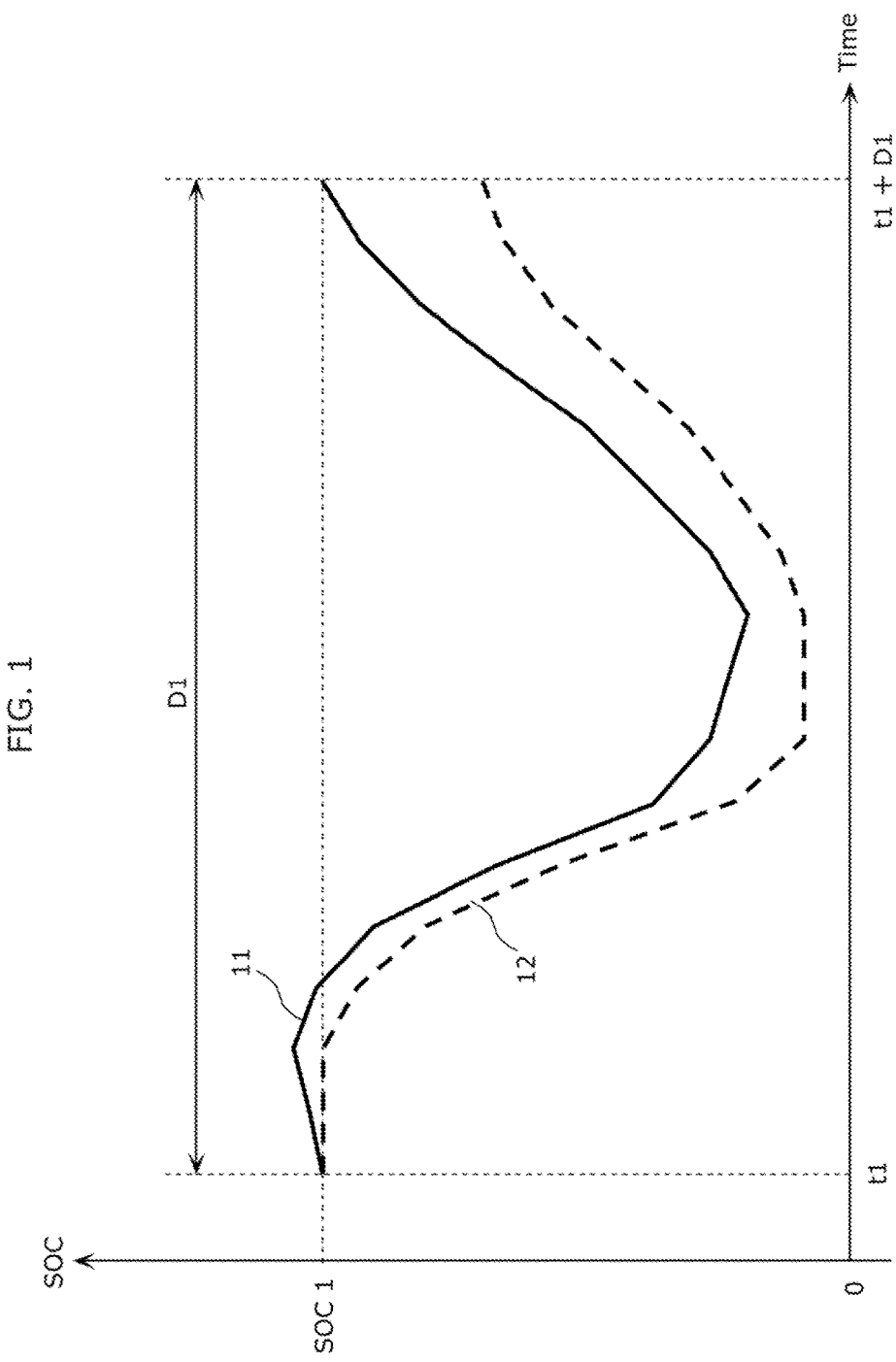
FIG. 1 is a diagram illustrating an example of a change of the SOC of the power storage apparatus in a stabilization control period.

FIG. 1 is a diagram illustrating an example of a change of the SOC of the power storage apparatus in a stabilization control period (frequency regulation period). In FIG. 1, a vertical axis denotes the SOC, and a horizontal axis denotes time.

When an average of the power instruction value in the stabilization control period D1 is ±0, as illustrated in a graph 11 in FIG. 1, the SOC of the power storage apparatus at time t1 +D1 should almost match with the SOC at time t1. In reality, however, a power conversion loss and the like occur in an inverter when power is charged or discharged. In view of this, as illustrated in a graph 12 in FIG. 1, the SOC of the power storage apparatus at time t1 +D1 decreases from the SOC at time t1. In this case, due to a decrease of the SOC, there is a possibility that the power storage apparatus is in a state of not being able to discharge.

Here, in order to address the above described problem, Patent Literature 1 discloses a method of maintaining the SOC of the power storage apparatus by correcting the power instruction value (output instruction value) using a charge or discharge efficiency value, by discharging power less than a power value indicating the power instruction value when the power storage apparatus discharges, and by charging power more than a power value indicating the power instruction value when the power storage apparatus charges.

Figure 2:
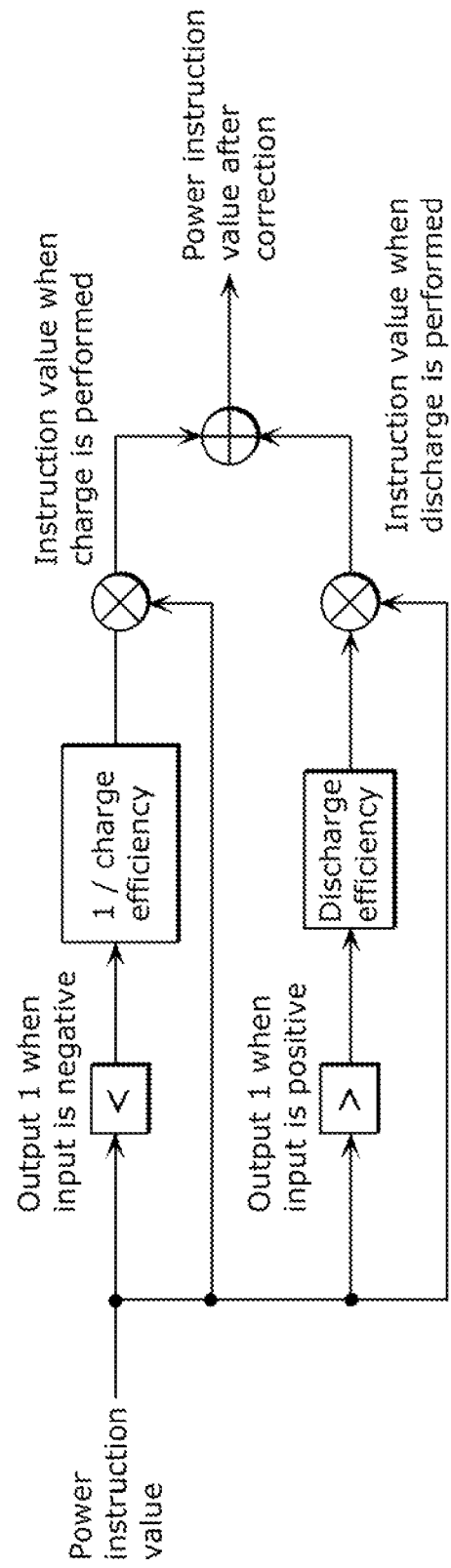
FIG. 2 is a diagram illustrating a correction method of a power instruction value illustrated in Patent Literature 1.

FIG. 2 is a diagram illustrating a correction method of a power instruction value illustrated in Patent Literature 1.

In FIG. 2, when the power instruction value is a negative value, that is, when the power instruction value indicates charge of the power storage apparatus (charge instruction), a value obtained by dividing the power instruction value by charging efficiency is used as a power instruction value after correction. Meanwhile, when the power instruction value is a positive value, that is, when the power instruction value indicates discharge of the power storage apparatus (discharge instruction), a value obtained by multiplying the power instruction value by discharging efficiency is used as a power instruction value after correction.

However, in the configuration as illustrated in FIG. 2, since the error between the power instruction value and the power value outputted from the power storage apparatus is larger, the output quality of the power storage apparatus (responsiveness of the output of the power storage apparatus to the power instruction value) is not sufficient.

Here, the output quality is quantitatively calculated by the power system operator as a performance score. Specifically, for example, the performance score is evaluated based on a weighted sum of each of the three evaluation values of "degree of delay", "degree of correlation", and "degree of precision" of a power value of power actually outputted from the power storage apparatus with respect to the power instruction value. Quantitatively, the "degree of delay" indicates a delay, the "degree of correlation" indicates a similarity of waveforms, and the "degree of precision" indicates a degree of similarity of the size of output.

In the configuration as illustrated in Patent Literature 1, since the difference between the output value of the power storage apparatus and the instruction value is large when the discharge amount of the power storage apparatus is large, the "degree of precision" tends to be the lowest among the three evaluation values. Moreover, since a distortion occurs in the output waveform of the power storage apparatus when the charge amount of the power storage apparatus is large, the "degree of correlation" tends to be the lowest among the evaluation values.

Moreover, the object of a method of correcting a power value using an efficiency value of charge or discharge illustrated in Patent Literature 1 is to maintain the SOC. In view of this, according the above described method, the SOC control having a high degree of precision which increases or decreases the SOC by an arbitrary amount cannot be realized.

Moreover, the performance score indicates a higher contribution to stabilization of the grid when the value of the performance score is higher. However, a calculation method of the performance score is different for each of the power system operators. Moreover, in the long term, it is possible that the calculation method of the performance score is changed depending on a change in the situation of the grid.

Here, since the correction method of the power instruction method illustrated in Patent Literature 1 does not consider the calculation method of the performance score, the performance score tends to be low.

In order to solve the above described problem, a charge or discharge control method according to an aspect of the present invention is a charge or discharge control method for controlling charge or discharge of a power storage apparatus connected to a grid in a stabilization control period for stabilizing power of the grid, the charge or discharge control method including: receiving, in the stabilization control period, a power instruction value indicating a power value of power which the power storage apparatus is to charge or discharge; obtaining a remaining state of charge (SOC) of the power storage apparatus, and a target SOC which is a target value of the SOC of the power storage apparatus; and controlling charge or discharge of the power storage apparatus according to the power instruction value, when the power instruction value is received, wherein, in the controlling, where a delay time is determined according to a difference between the target SOC and the remaining SOC, the power instruction value indicating discharge of the power storage apparatus is a positive value, and the power instruction value indicating charge of the power storage apparatus is a negative value, (i) when the remaining SOC is smaller than the target SOC, control is performed to cause the power storage apparatus to charge or discharge according to the power instruction value, in a period in which the power instruction value increases as time passes, at a timing when the delay time passes after the power instruction value is received, and (ii) when the remaining SOC is larger than the target SOC, control is performed to cause the power storage apparatus to charge or discharge according to the power instruction value, in a period in which the power instruction value decreases as time passes, at a timing when the delay time passes after the power instruction value is received.

According to the charge or discharge control method, it is possible to control the SOC of the power storage apparatus while reducing degradation of a "degree of correlation" and a "degree of precision" in the performance score.

Moreover, it is possible that in the controlling, the delay time is determined to be a longer time as the difference between the target SOC and the remaining SOC is larger.

Moreover, it is possible that in the controlling, when the first power value is received, the delay time is determined to be a shorter time as a difference is larger between a first power value and a second power value received earlier than the first power value, and then control is performed to cause the power storage apparatus to charge or discharge according to the first power instruction value at a timing when the delay time passes after the first power instruction value is received.

When a change of the power instruction value is large, the performance score tends to decrease. In view of this, according to the charge or discharge control method, it is possible to control the SOC while more efficiently reducing degradation in the output quality.

It is possible that in the controlling, a predicted instruction value which predicts a future power instruction value is calculated using history of the power instruction value previously received, and (i) when the remaining SOC is smaller than the target SOC, control is performed to cause the power storage apparatus to charge or discharge according to the predicted instruction value corresponding to the power instruction value, in a period in which the predicted instruction value corresponding to the power instruction value increases as time passes, at a timing when the delay time passes after the power instruction value is received, and control is performed to cause the power storage apparatus to charge or discharge according to the predicted instruction value corresponding to the power instruction value, in a period in which the predicted instruction value corresponding to the power instruction value decreases as time passes, at a timing which precedes, by the delay time, from when the power instruction value is received, and (ii) when the remaining SOC is larger than the target SOC, control is performed to cause the power storage apparatus to charge or discharge according to the predicted instruction value corresponding to the power instruction value, in a period in which the predicted instruction value corresponding to the power instruction value decreases as time passes, at a timing when the delay time passes after the power instruction value is received, and control is performed to cause the power storage apparatus to charge or discharge according to the predicted instruction value corresponding to the power instruction value, in a period in which the predicted instruction value corresponding to the power instruction value increases as time passes, at a timing which precedes, by the delay time, from when the power instruction value is received.

As described above, by calculating the predictive value of the power instruction value, it is possible to control the SOC at a fast rate.

Moreover, it is possible that in the obtaining, the remaining SOC is obtained in a predetermined period, and the target SOC is a target value of the SOC after passage of predetermined time from a timing when the remaining SOC is obtained.

Moreover, it is possible that in the controlling, the delay time is determined to be a time which is shorter than predetermined upper limit of time.

Moreover, it is possible that the delay time includes a time from when the power instruction value is received to when the charge or discharge of the power storage apparatus is started according to the power instruction value.

With this, it is possible to efficiently control the SOC in the stabilization control using the calculation method of the performance score which avoids degrading a "degree of delay" in the performance score when the delay time is within a certain range.

Moreover, a charge or discharge control method according to an aspect of the present invention includes is a charge or discharge control method for controlling charge or discharge of a power storage apparatus connected to a grid in a stabilization control period for stabilizing power of the grid, the charge or discharge control method including: receiving, in the stabilization control period, a power instruction value indicating a power value of power which the power storage apparatus is to charge or discharge; obtaining a remaining state of charge (SOC) of the power storage apparatus, and a target SOC which is a target value of the SOC of the power storage apparatus; and (i) determining, when the remaining SOC is smaller than the target SOC, a first offset power value which is a power value which indicates charge and has an absolute value which is larger when the absolute value of the power value indicated by the power instruction value is smaller, and causing the power storage apparatus to charge or discharge power of a power value obtained by adding the first offset power value and the power value indicated by the power instruction value, and (ii) determining, when the remaining SOC is larger than the target SOC, a second offset power value which is a power value which indicates discharge and has an absolute value which is larger when the absolute value of the power value indicated by the power instruction value is smaller, and causing the power storage apparatus to charge or discharge power of a power value obtained by adding the second offset power value and the power value indicated by the power instruction value.

According to the charge or discharge control method, it is possible to control the SOC of the power storage apparatus while reducing degradation of a "degree of correlation" in the performance score.

Moreover, a charge or discharge control method according to an aspect of the present invention is a charge or discharge control method for controlling charge or discharge of a power storage apparatus connected to a grid in a stabilization control period for stabilizing power of the grid, the charge or discharge control method including: receiving, in the stabilization control period, a power instruction value indicating a power value of power which the power storage apparatus is to charge or discharge; obtaining a remaining state of charge (SOC) of the power storage apparatus, and a target SOC which is a target value of the SOC of the power storage apparatus; determining predetermined time according to a difference between the target SOC and the remaining SOC, (i) stopping charge or discharge of the power storage apparatus for the predetermined time in every predetermined period, when the remaining SOC is smaller than the target SOC, in a period in which the power instruction value indicates discharge, and (ii) stopping charge or discharge of the power storage apparatus for the predetermined time in every predetermined period, when the remaining SOC is larger than the target SOC, in a period in which the power instruction value indicates charge.

According to the charge or discharge control method, it is possible to control the SOC of the power storage apparatus while reducing degradation of a "degree of precision" in the performance score.

Moreover, a charge or discharge control method according to an aspect of the present invention is a charge or discharge control method for controlling charge or discharge of a power storage apparatus connected to a grid in a stabilization control period for stabilizing power of the grid, the charge or discharge control method including: receiving, in the stabilization control period, a power instruction value indicating a power value of power which the power storage apparatus is to charge or discharge; obtaining a remaining state of charge (SOC) of the power storage apparatus, and a target SOC which is a target value of the SOC of the power storage apparatus; and (i) determining a first offset power value which is a power value which indicates charge and is smaller when the power value indicating the power instruction value is larger, when the remaining SOC is smaller than the target SOC, and causing the power storage apparatus to charge or discharge power of a power value obtained by adding the first offset power value and the power value indicated by the power instruction value, (ii) determining a second offset power value which indicates discharge and is larger when the power value indicated by the power instruction value is smaller, when the remaining SOC is larger than the target SOC, and causing the power storage apparatus to charge or discharge power of a power value obtained by adding the second offset power value and the power value indicated by the power instruction value, where a power value indicating discharge of the power storage apparatus is a positive value and a power value indicating charge of the power storage apparatus is a negative value.

According to the charge or discharge control method, it is possible to control the SOC of the power storage apparatus while reducing degradation of a "degree of correlation" in the performance score.

Moreover, a charge or discharge control method according to an aspect of the present invention is a charge or discharge control method for controlling charge or discharge of a power storage apparatus connected to a grid in a stabilization control period for stabilizing power of the grid, based on a performance score indicating responsiveness of the charge or discharge to a power instruction value, the charge or discharge control method including: receiving, in the stabilization control period, a power instruction value indicating a power value of power which the power storage apparatus is to charge or discharge; obtaining a remaining state of charge (SOC) of the power storage apparatus, and a target SOC which is a target value of the SOC of the power storage apparatus; and controlling charge or discharge of the power storage apparatus according to the power instruction value, when the power instruction value is received, wherein the performance score is represented by a weighted sum of each of a degree of delay, a degree of correlation, and a degree of precision, the each of the degree of delay, the degree of correlation, and the degree of precision being between a power value indicated by the power instruction value and a power value of power charged or discharged from the power storage apparatus according to the power instruction value, and in the controlling, based on a weight of the performance score, charge or discharge of the power storage apparatus is controlled according to one control method selected from among a first control method, a second control method, and a third control method, wherein in the first control method, where a delay time is determined according to a difference between the target SOC and the remaining SOC, the power instruction value indicating discharge of the power storage apparatus is a positive value, and the power instruction value indicating charge of the power storage apparatus is a negative value, (i) when the remaining SOC is smaller than the target SOC, control is performed to cause the power storage apparatus to charge or discharge according to the power instruction value, in a period in which the power instruction value increases as time passes, at a timing when the delay time passes after the power instruction value is received, and (ii) when the remaining SOC is larger than the target SOC, control is performed to cause the power storage apparatus to charge or discharge according to the power instruction value, in a period in which the power instruction value decreases as time passes, at a timing when the delay time passes after the power instruction value is received, in the second control method, (i) when the remaining SOC is smaller than the target SOC, a first offset power value is determined which is a power value which indicates charge and has an absolute value which is larger when the absolute value of the power value indicated by the power instruction value is smaller, and the power storage apparatus is caused to charge or discharge power of a power value obtained by adding the first offset power value and the power value indicated by the power instruction value, and (ii) when the remaining SOC is larger than the target SOC, a second offset power value is determined which is a power value which indicates discharge and has an absolute value which is larger when the absolute value of the power value indicated by the power instruction value is smaller, and the power storage apparatus is caused to charge or discharge power of a power value obtained by adding the second offset power value and the power value indicated by the power instruction value, and in the third control method, predetermined time is determined according to a difference between the target SOC and the remaining SOC, (i) charge or discharge of the power storage apparatus is stopped for the predetermined time in every predetermined period, when the remaining SOC is smaller than the target SOC, in a period in which the power instruction value indicates discharge, and (ii) charge or discharge of the power storage apparatus is stopped for the predetermined time in every predetermined period, when the remaining SOC is larger than the target SOC, in a period in which the power instruction value indicates charge.

According to the charge or discharge control method, it is possible to appropriately correct the power instruction value based on the calculation method of the performance score.

It should be noted that these general and specific aspects may be implemented using a system, an apparatus, an integrated circuit, a computer program, or a computer-readable recording medium such as a CD-ROM, or any combination of systems, apparatuses, integrated circuits, computer programs, or computer-readable recording media.

The following will describe the embodiments with reference to the drawings.

Each of the exemplary embodiments described below shows a general or specific example. The numerical values, shapes, materials, structural elements, the arrangement and connection of the structural elements, steps, the processing order of the steps etc. shown in the following exemplary embodiments are mere examples, and therefore do not limit the scope of the appended Claims and their equivalents. Therefore, among the structural elements in the following exemplary embodiments, structural elements not recited in any one of the independent claims are described as arbitrary structural elements.

(Embodiment 1)

Figure 3:
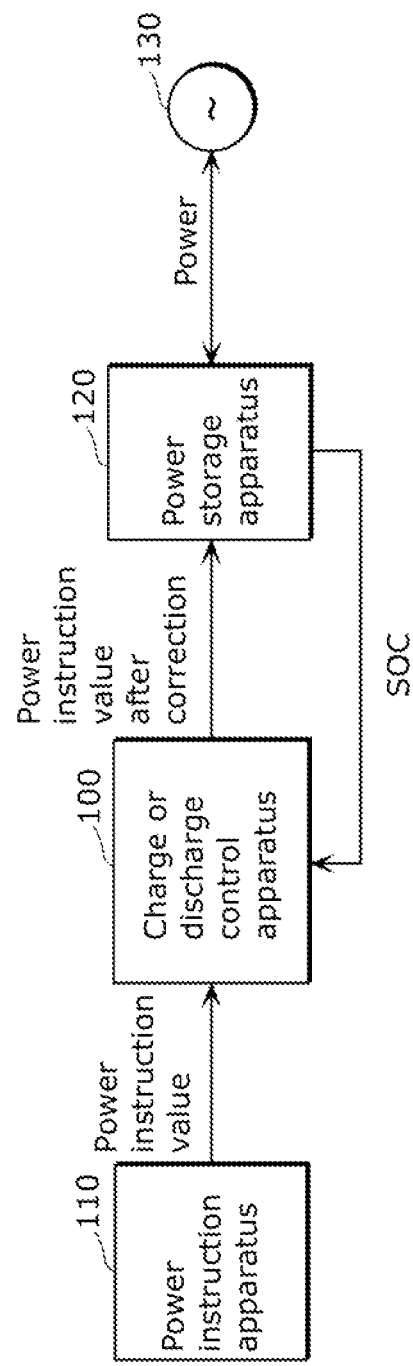
FIG. 3 is a diagram illustrating an outline of a charge or discharge control apparatus according to an embodiment.

FIG. 3 is a diagram illustrating an outline of a charge or discharge control apparatus according to Embodiment 1.

In FIG. 3, a charge or discharge control apparatus 100 is an apparatus which, in a predetermined stabilization control period, controls charge or discharge of a grid 130 of a power storage apparatus 120, by receiving a power instruction value outputted from a power instruction apparatus 110 and by outputting a power instruction value after correction to the power storage apparatus 120. It should be noted that in the present embodiment, the stabilization control period is described as a configuration of a plurality of steps by setting a 10-minute period as a step.

Moreover, by obtaining the SOC from the power storage apparatus 120, the charge or discharge control apparatus 100 performs charge or discharge of the power storage apparatus 120 which follows the power instruction value in organic collaboration with the power storage apparatus 120, and controls the SOC of the power storage apparatus 120. In other words, the charge or discharge control apparatus 100 and the power storage apparatus 120 constitute an electric storage control system.

The power storage apparatus 120 is an apparatus which has a capability of storing and releasing electric energy, and specifically includes a secondary battery such as a lead storage battery, a lithium-ion battery, a redox flow battery, and a fly wheel, and a pumped-storage power generator.

In the present embodiment, the power instruction apparatus 110 is an apparatus owned by a power system operator, and transmits a power instruction value to the charge or discharge control apparatus 100 in order to control a frequency of the grid 130 within a certain range.

It should be noted that the charge or discharge control apparatus 100 can be realized not only by a microprocessor, a digital signal processor (DSP), and a system LSI, but also by a server and a cloud on the Internet.

Here, the power instruction value will be described.

Figure 4:
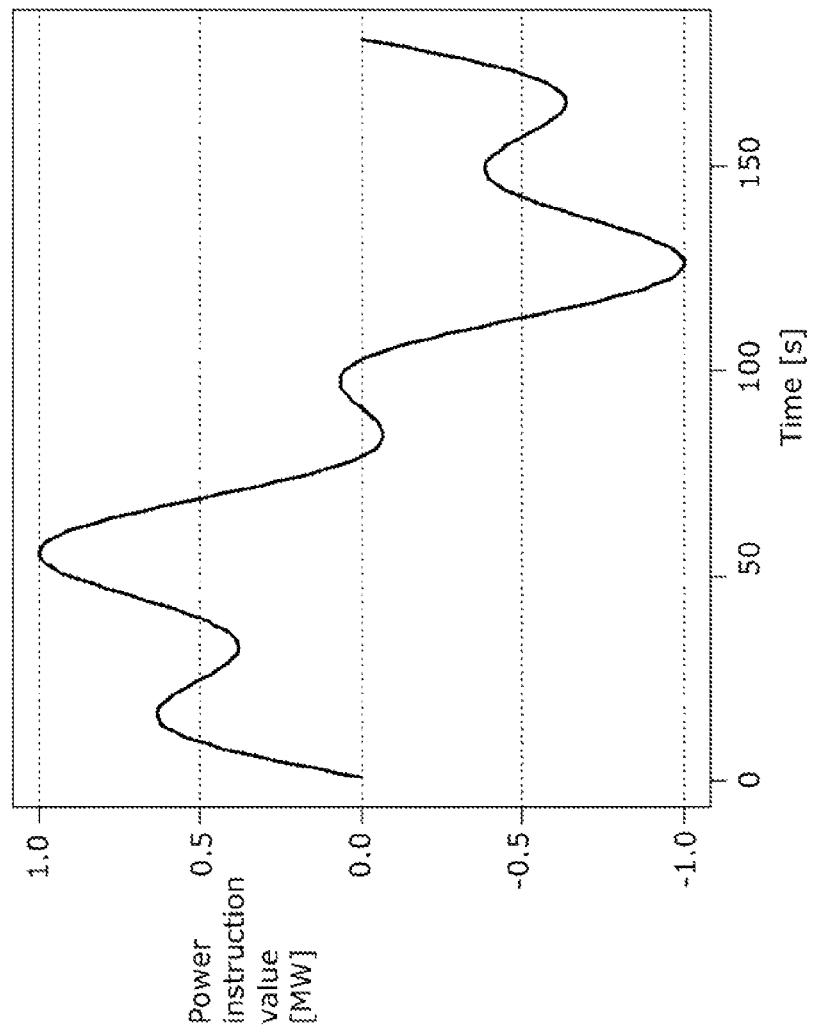
FIG. 4 is a diagram illustrating an example of the power instruction value.

FIG. 4 is a diagram illustrating an example of the power instruction value. In FIG. 4, a horizontal axis denotes time, and a vertical axis denotes a power instruction value.

In the present embodiment, the power instruction value is a power value of power that the power storage apparatus 120 needs to charge or discharge according to the power instruction value. Here, in the present embodiment, the power instruction value is an instruction value which instructs the power storage apparatus 120 to discharge when the power instruction value is a positive value (+), and instructs the power storage apparatus 120 to charge when the power instruction value is a negative value (−). Moreover, when the absolute value of the power instruction value is larger, the power storage apparatus 120 performs more charge or discharge.

The following description assumes that the power storage apparatus 120 can output power within a range of ±1.0 MW. In other words, as illustrated in FIG. 4, the upper limit value of the power instruction value is +1.0 MW, and the lower limit value of the power instruction value is −1.0 MW. Moreover, the power instruction value is transmitted to the charge or discharge control apparatus 100 in a period of several seconds, that is, a period of 2 seconds.

The power instruction value in the stabilization control largely changes in a short time because the power instruction value depends on a change of deviation of the frequency of the grid 130. However, the power instruction value does not deviate in one direction. Therefore, the average of the power instruction value in a long term tends to be ±0.

It should be noted that the power instruction value may indicate a ratio to the largest value of the output of the power storage apparatus 120 (±1.0 MW, hereinafter also referred to as control capability), instead of as the power value itself. In this case, the power value of power that the power storage apparatus 120 charges and discharges according to the power instruction value is (control capability)×(ratio indicated by power instruction value).

Next, the charge or discharge control apparatus 100 will be described.

Figure 5:
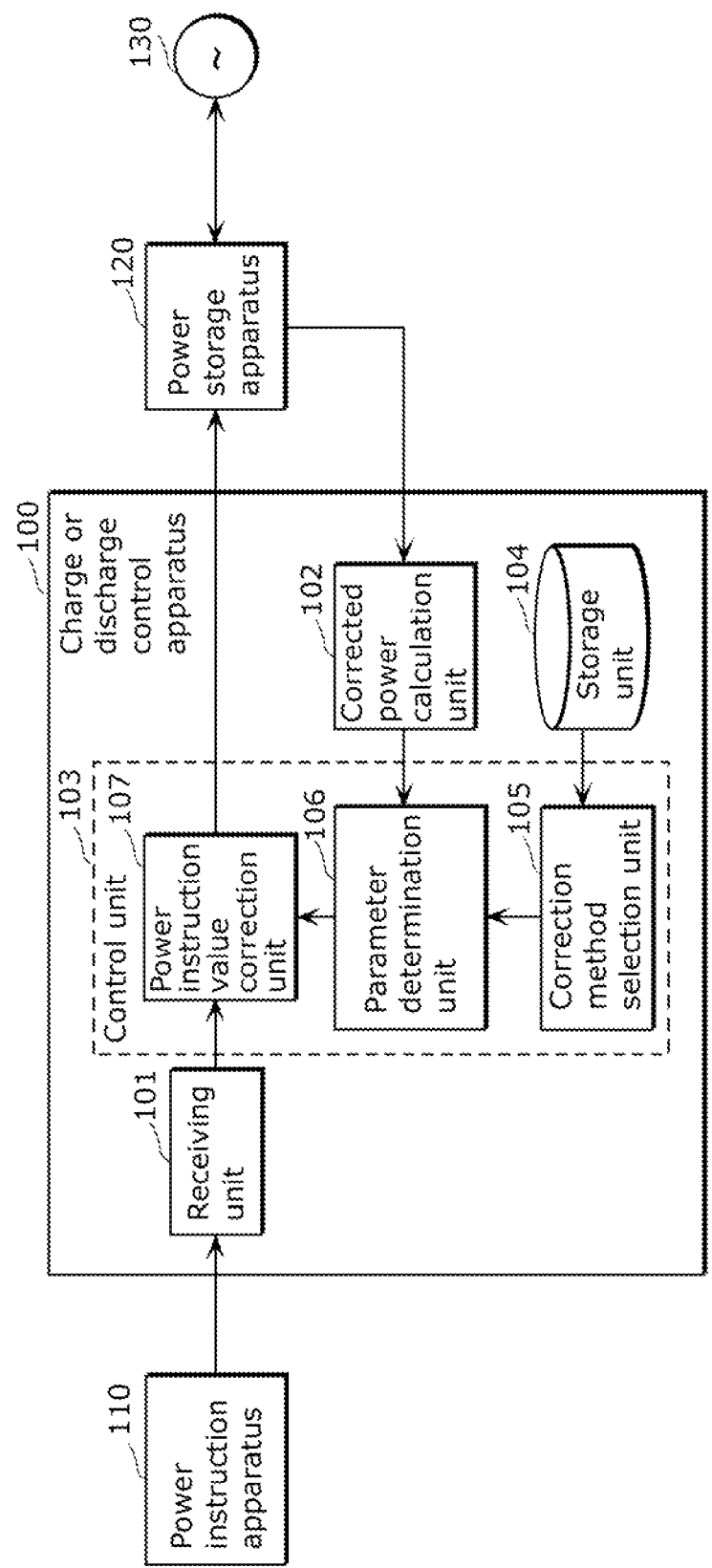
FIG. 5 is a block diagram illustrating a configuration of a charge or discharge control apparatus according to an embodiment.

FIG. 5 is a block diagram illustrating a configuration of the charge or discharge control apparatus 100 according to Embodiment 1. It should be noted that in FIG. 5, the same reference signs are assigned to the same structural elements as those in FIG. 3, and a description thereof will be omitted.

The charge or discharge control apparatus 100 includes a receiving unit 101, a corrected power amount calculation unit 102, a control unit 103, and a storage unit 104.

The receiving unit 101 receives a power instruction value in every predetermined period in the stabilization control period. In the present embodiment, the receiving unit 101 receives a power instruction value in every period of 2 seconds. It should be noted that in the present embodiment, the power instruction value is transmitted from the power instruction apparatus 110. However, the charge or discharge control apparatus 100 may determine the power instruction value. For example, the charge or discharge control apparatus 100 may further include a power instruction value determination unit which measures a frequency of AC current of the grid 130 and determines the power instruction value according to the measured frequency, and the receiving unit 101 may receive the power instruction value determined by the power instruction value determination unit.

The corrected power amount calculation unit 102 obtains information about the SOC of the power storage apparatus 120 and information about a target SOC which is a target value of the SOC of the power storage apparatus 120, and then calculates a corrected power amount. The SOC is, for example, represented by a percentage.

The storage unit 104 stores a calculation formula of the performance score to be described later. Information about the calculation formula of the performance score stored in the storage unit 104 may be stored outside the charge or discharge control apparatus 100, such as a cloud on the Internet. In other words, the storage unit 104 is not an indispensable structural element.

It should be noted that the calculation formula of the performance score PS stored in the storage unit 104 is updated when initializing in introducing a charge or discharge control system using the charge or discharge control apparatus 100 and when changing a contract of the performance score calculation formula of the power system operator.

In the stabilization control period, the control unit 103 performs control of causing the power storage apparatus 120 to charge or discharge power of a power value indicated by the power instruction value every time the receiving unit 101 receives the power instruction value. In other words, the control unit 103 performs control of causing the power storage apparatus 120 to charge or discharge power of a power value indicated by the power instruction value when the receiving unit 101 receives the power instruction value. Here, "when the receiving unit 101 receives the power instruction value" means a predetermined timing including a delay time which is inevitably generated from when the receiving unit 101 receives the power instruction value to when the receiving unit 101 causes the power storage apparatus 120 to charge or discharge according to the power instruction value.

The control unit 103 includes a correction method selection unit 105, a parameter determination unit 106, and a power instruction value correction unit 107.

The correction method selection unit 105 selects a correction method of the power instruction method based on the performance score calculation formula to quantitatively calculate the output quality of the power storage apparatus 120.

The parameter determination unit 106 determines a corrected parameter to correct the power instruction value, based on the corrected power amount calculated by the corrected power amount calculation unit 102 and the correction method selected by the correction method selection unit 105.

Using the correction method and the corrected parameter, the power instruction value correction unit 107 corrects the power instruction value that the receiving unit 101 obtains from the power instruction apparatus 110, and then outputs the corrected instruction value to the power storage apparatus 120.

Next, the performance score will be described.

The performance score is a value which quantitatively indicates the output quality of the power storage apparatus 120 with respect to the power instruction value. Here, the performance score PS is represented by Expression (1) using the three evaluation values D, A, and P.

[Math. 1]

$$PS = k_1 D + k_2 A + k_3 P \qquad \text{Expression (1)}$$

Here, D denotes a degree of delay which indicates a degree of delay of the output value of the power storage apparatus 120 (power value of power actually outputted from the power storage apparatus 120) to the power instruction value, A denotes a degree of correlation which indicates a degree of correlation between the power instruction value and the output value of the power storage apparatus 120, and P denotes a degree of precision which depends on the error between the power instruction value and the output value of the power storage apparatus 120. Moreover, $k_i$ is a weight coefficient of each of the evaluation values, and is a real number which satisfies Expression (2) and is no less than 0.

[Math. 2]

$$\sum_{i=1}^{3} k_i = 1 \qquad \text{Expression (2)}$$

The degree of delay D is calculated using Expression (3) where Δ represents a delay time of the power storage apparatus 120 with respect to the power instruction value of the power storage apparatus 120, and T represents an assumed longest delay time.

[Math. 3]

$$D = \left| \frac{\Delta - T}{T} \right| \qquad \text{Expression (3)}$$

Here, as an example, T is 5 [min]. Moreover, in the present embodiment, the delay time Δ is a time difference between the waveforms when the waveform of the power instruction value and the waveform of the output value of the power storage apparatus 120 are gradually moved and then the degree of correlation between the two becomes the largest.

The degree of correlation A is calculated using a correlation function y and Expression (4).

[Math. 4]

$$A = \gamma(r, y_{t-\Delta})  \quad \text{Expression (4)}$$

Here, r denotes the power instruction value, and $y_{t-\Delta}$ is a value obtained by extending the output value of the power storage apparatus 120 back by the delay time $\Delta$ and then performing a parallel shift. In other words, an influence of the delay time $\Delta$ is removed from the degree of correlation A.

The degree of precision P is calculated using Expression (5).

[Math. 5]

$$P = 1 - \frac{\text{avg}|r - y|}{\text{avg}|r|} \quad \text{Expression (5)}$$

Here, r denotes the power instruction value, and y denotes the output value of the power storage apparatus 120. In other words, the degree of precision P is a value obtained by subtracting the error rate of the power instruction value and the output value of the power storage apparatus 120 from 1.

Each of the degree of delay, the degree of correlation, and the degree of precision takes a value from 0.0 to 1.0, and indicates that the output quality is better when the value is closer to 1.0. Moreover, as illustrated by Expression (1) and Expression (2), the performance score PS also takes a value from 0.0 to 1.0, and indicates that the output quality is better when the value is closer to 1.0.

It should be noted that the weight coefficient $k_i$ of each of the evaluation values is different depending on the grid 130 which is the target of the stabilization control, and the weight coefficient $k_i$ is determined by the power system operator. It should be noted that in the present embodiment, as described above, the performance score PS having the value of the weight coefficient $k_i$ which is a parameter will be described. The calculation formula of the performance score PS is not limited to Expression (1), and may be another calculation formula.

Next, the whole operation of the charge or discharge control apparatus 100 will be described.

Figure 6:
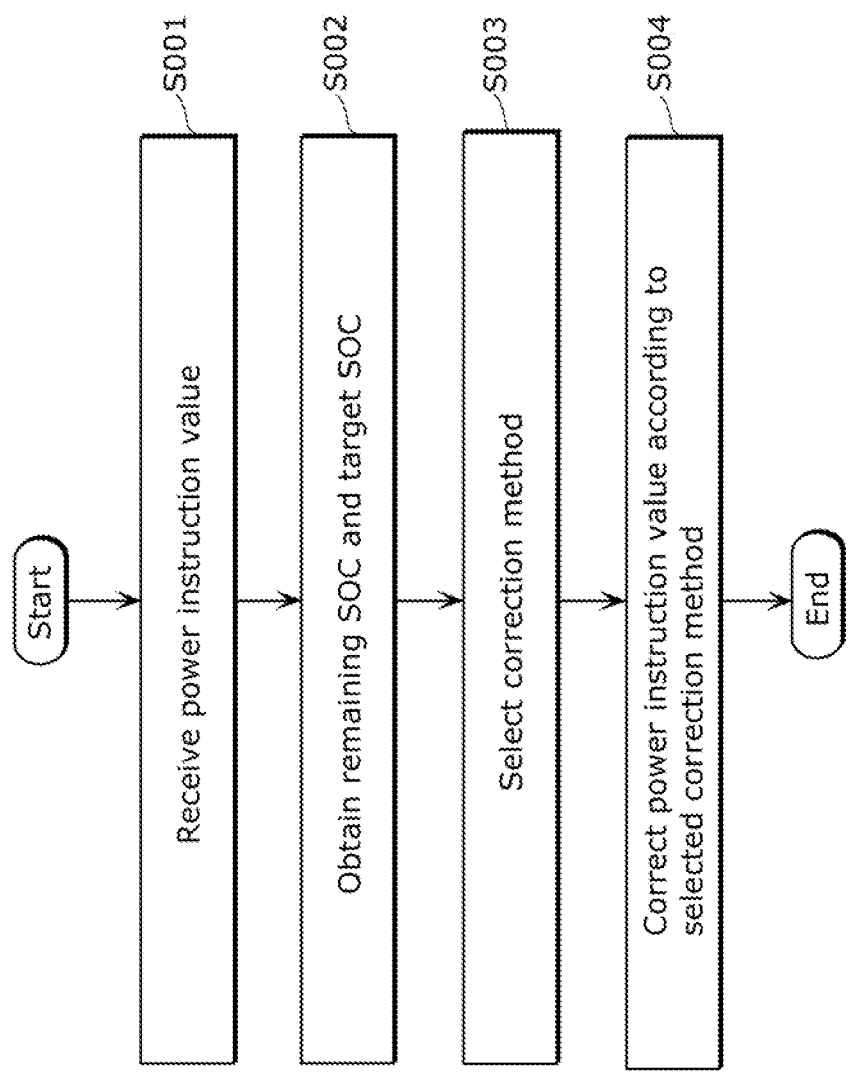
FIG. 6 is a flowchart illustrating an operation of the charge or discharge control apparatus.

FIG. 6 is a flowchart illustrating the operation of the charge or discharge control apparatus 100.

First, the receiving unit 101 receives the power instruction value (S001).

Next, the corrected power amount calculation unit 102 obtains the remaining SOC of the power storage apparatus 120, and the target SOC of the power storage apparatus 120 (S002). More specifically, the corrected power amount calculation unit 102 calculates the corrected power amount from a difference between the remaining SOC (actual SOC) and the target SOC (predetermined SOC).

Next, the control unit 103 (correction method selection unit 105) selects a selection method of the power instruction value based on the performance score calculation formula (S003).

Lastly, the control unit 103 (power instruction value correction unit 107) corrects the power instruction value according to the selected correction method, and then outputs the corrected instruction value to the power storage apparatus 120 (S004).

Next, a detailed operation of each of the structural elements of the charge or discharge control apparatus 100 will be described.

First, the operation of the corrected power amount calculation unit 102 will be described.

The corrected power amount calculation unit 102 calculates, in order to control the SOC of the power storage apparatus 120, a corrected power amount from a difference between the actual SOC of the power storage apparatus 120 and the predetermined SOC (target SOC).

Here, the predetermined SOC is a certain SOC, or the SOC (planned SOC) which is planned by the operator of the electric storage control system and changes depending on time. In the present embodiment, the corrected power amount calculation unit 102 calculates a corrected power amount from a difference between the actual SOC of the power storage apparatus 120 and the target SOC of the power storage apparatus 120.

The corrected power amount is a power amount indicating how much more (or less) power of a power value that the power storage apparatus 120 should charge or discharge compared with the power value indicated by the power instruction value in one step.

It should be noted it is desirable that the corrected power amount calculation unit 102 calculates the corrected power amount at a frequency of about once in one step in the stabilization control period. However, the corrected power amount calculation unit 102 may calculate the corrected power amount at a frequency of less than once in one step.

Figure 7:
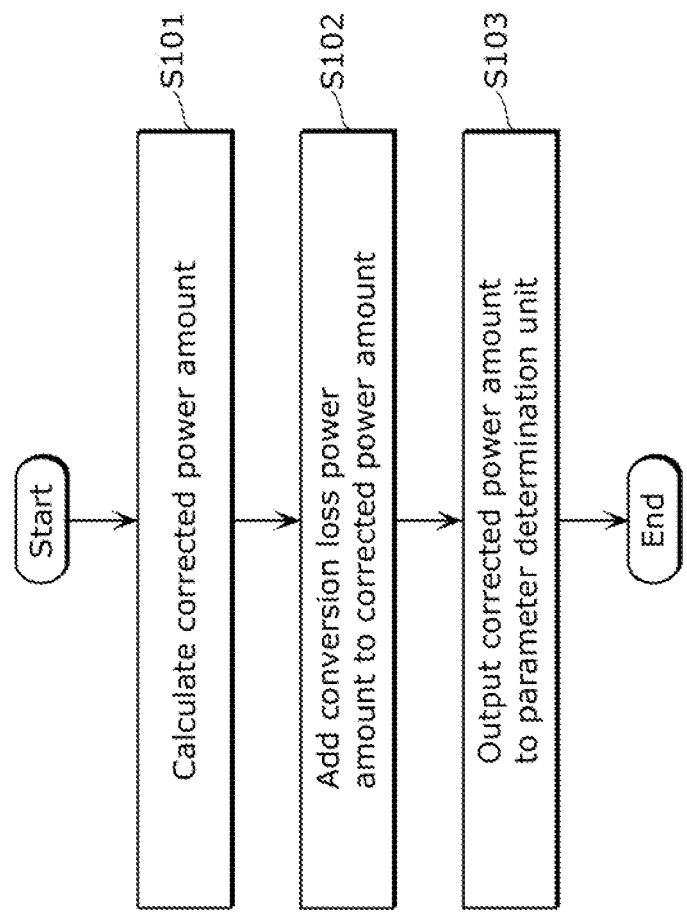
FIG. 7 is a flowchart illustrating an operation of a corrected power amount calculation unit.

The following will sequentially describe the operation of the corrected power amount calculation unit 102 with reference to FIG. 7. It should be noted that in the present embodiment, the stabilization control period is composed of Step 1, Step 2, . . . Step n that are successive, by setting a period of 10 minutes as one step.

FIG. 7 is a flowchart illustrating an operation of the corrected power amount calculation unit 102.

First, at the start point of each step, the corrected power amount calculation unit 102 (S101) calculates, using Expression (6), calculates the corrected power amount in the step based on the difference between the planned SOC and the actual SOC obtained from the power storage apparatus 120 (S101).

[Math. 6]

$$x_n = \frac{T_c}{T_e}(C_n - c_n) \quad \text{Expression (6)}$$

Here, $x_n$ denotes the corrected power amount in Step n, $C_n$ denotes a planned SOC, $c_n$ denotes the SOC in the step, $T_c$ denotes the time of one step, and $T_e$ denotes predetermined time set to correct the difference. In the present embodiment, $T_c$ is 10 minutes, and $T_e$ is 60 minutes.

Figure 8:
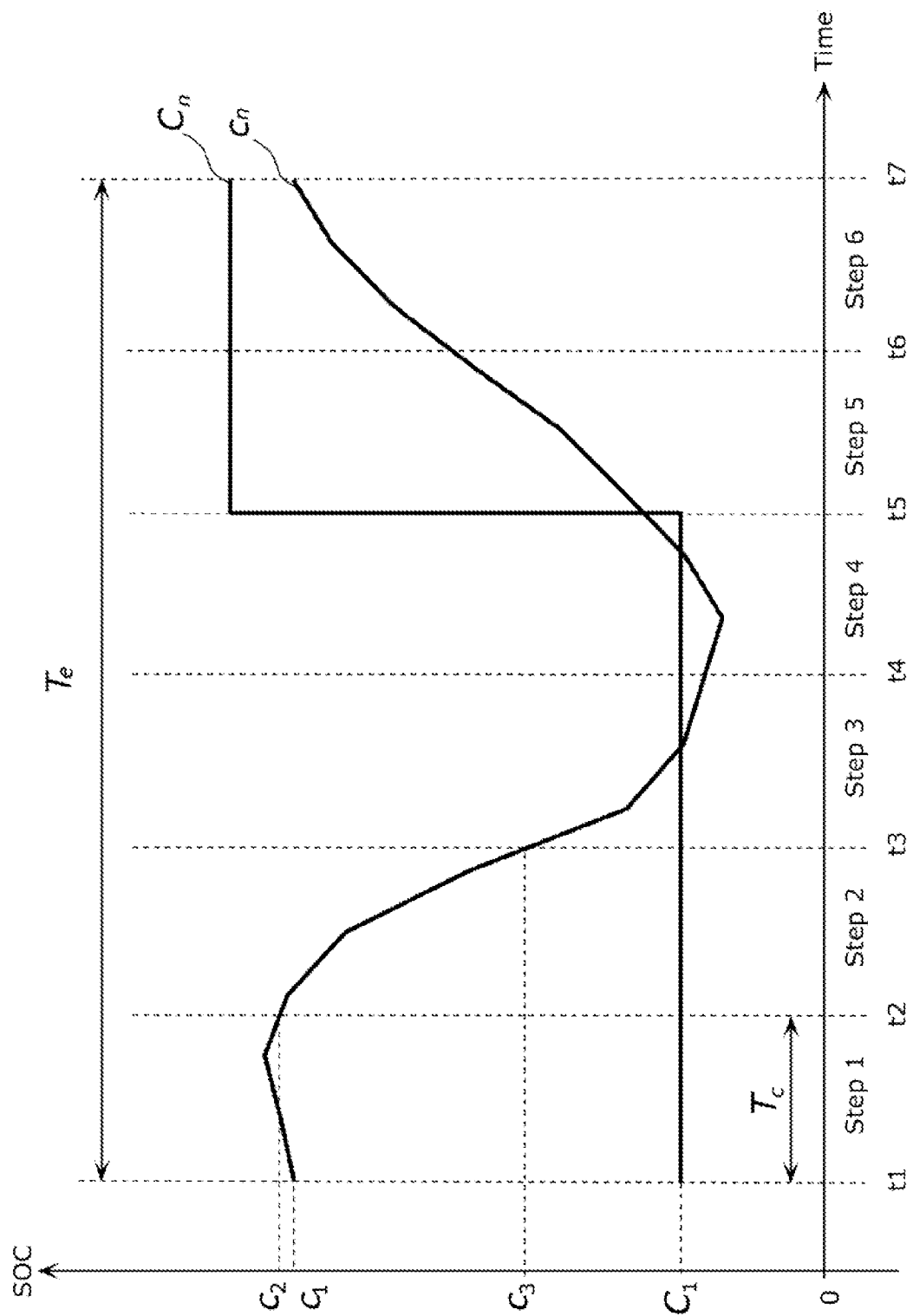
FIG. 8 is a diagram illustrating an example of a planned SOC and an actual SOC.

FIG. 8 is a diagram illustrating an example of a planned SOC and an actual SOC.

At the start point of time t1 of Step 1, the corrected power amount calculation unit 102 calculates the corrected power amount in Step 1. Since the planned SOC at this time is $C_1$ and the actual SOC is $c_1$, $x_n = (C_1 - c_1) \times T_c / T_e$.

Next, the corrected power amount calculation unit 102 corrects again the corrected power value $x_n$ calculated by Expression (6), using Expression (7) (S102).

[Math. 7]

$$x_n = x_n + L \quad \text{Expression (7)}$$

Here, L is a power amount which corresponds to the one step of average power loss (conversion loss power amount) which is generated when the power storage apparatus 120 charges and discharges to the grid 130. It should be noted that the corrected power amount calculation unit 102 does not have to add the conversion loss power amount in Step S102.

Lastly, the corrected power amount calculation unit 102 outputs, to the parameter determination unit 106, the corrected power amount $x_n$ which is calculated using Expression (6) (and Expression (7)) (S103).

Next, the operation of the correction method selection unit 105 will be described.

The correction method selection unit 105 selects a correction method of the power instruction value based on the performance score PS calculation formula stored in the storage unit 104. In the present embodiment, the correction method selection unit 105 selects the correction method of the power instruction unit based on the weight coefficient $k_i$ of each evaluation value which is part of the calculation formula.

Specifically, the correction method selection unit 105 selects one of the correction methods from the first correction method (correction method $M_1$) which prioritizes the degree of correlation A and the degree of accuracy P, the second correction method which prioritizes the degree of correlation A (correction method $M_2$), and the third correction method which prioritizes the degree of precision P (correction method $M_3$).

It should be noted that Embodiment 1 will mainly describe the correction method $M_1$ in detail, and Embodiment 2 and Embodiment 3 will describe the correction method $M_2$ and the correction method $M_3$, respectively.

Figure 9:
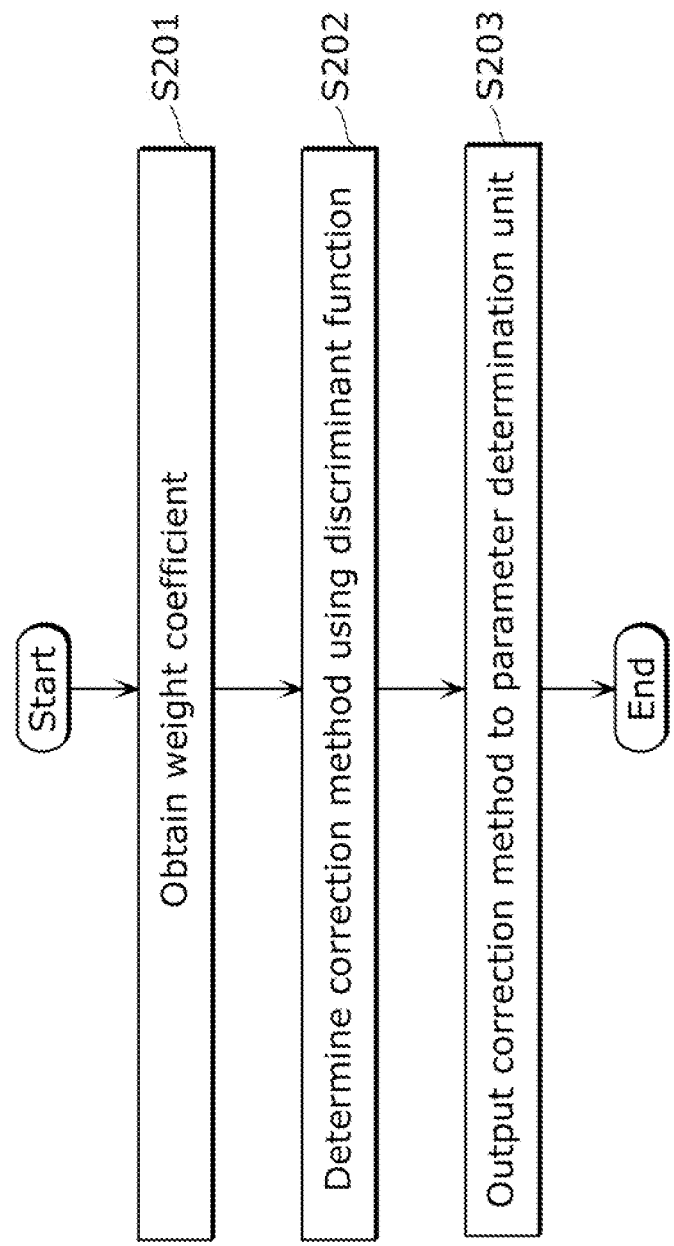
FIG. 9 is a flowchart illustrating an operation of a correction method selection unit.

FIG. 9 is a flowchart illustrating the operation of the correction method selection unit 105.

The correction method selection unit 105 obtains, from the storage unit 104, the weight coefficient $k_i$ of each evaluation value of the performance score calculation formula (S201).

Next, the correction method selection unit 105 determines the correction method of the power instruction value using a discriminant function which sets each weight coefficient as a variable (S202).

The discriminant function is a function obtained by linear combination of (i) the weight coefficient $k_i$ which is a variable in the discriminant function and (ii) a linear discriminant function. The discriminant function is obtained by a discriminant analysis.

As illustrated in Expression (8), the correction method selection unit 108 selects the correction method m from the correction method candidate $M_i$, using positive and negative of the sign of the discriminant function $f_{Li}$.

[Math. 8]

$$f_{Li} > 0 \Rightarrow m = M_i \qquad \text{Expression (8)}$$

Here, in the present embodiment, the correction method selection unit 105 uses the following three discriminant functions as the discriminant function $f_{Li}$. [Math. 9]

$$f_{L1} = -2k_1 + k_2 + k_3 \qquad \text{Expression (9)}$$

$$f_{L2} = -k_1 + 2k_2 - k_3 \qquad \text{Expression (10)}$$

$$f_{L3} = -k_1 - k_2 + 2k_3 \qquad \text{Expression (11)}$$

As described above, $k_1$ denotes the weight coefficient to be multiplied by the degree of delay D, $k_2$ denotes the weight coefficient to be multiplied by the degree of correlation A, and $k_3$ denotes the weight coefficient to be multiplied by the degree of precision P.

When the discriminant function $f_{L1}$ illustrated in Expression (9) satisfies a condition illustrated in Expression (8), that is, when the weight coefficient $k_1$ of the degree of delay D is smaller than the other weight coefficients, the correction method selection unit 105 selects the correction method $M_1$.

Similarly, when the discriminant function $f_{L2}$ illustrated in Expression (10) satisfies a condition illustrated in Expression (8), that is, when the weight coefficient $k_2$ of the degree of correlation A is larger than the other weight coefficients, the correction method selection unit 105 selects the correction method $M_2$. When the discriminant function $f_{L3}$ illustrated in Expression (11) satisfies a condition illustrated in Expression (8), that is, when the weight coefficient $k_3$ of the degree of precision P is larger than the other weight coefficients, the correction method selection unit 105 selects the correction method $M_3$.

It should be noted that when a plurality of the discriminant functions satisfy a condition illustrated in Expression (8), the correction method selection unit 105 selects a correction method in which the value of the discriminant function returns the largest value.

Lastly, the correction method selection unit 105 outputs the selected correction method m to the parameter determination unit 106 (S203).

As described above, the charge or discharge control apparatus 100 can secure responsiveness of the output of the power storage apparatus 120 to the power instruction value and can control the SOC of the power storage apparatus 120, by changing the correction method m of the power instruction value corresponding to the performance score PS calculation formula.

Next, the operation of the parameter determination unit 106 will be described in detail.

The parameter determination unit 106 determines a corrected parameter to correct the power instruction value, using the corrected power amount $x_n$ calculated by the corrected power amount calculation unit 102 and the correction method m selected by the correction method selection unit 105. It should be noted that the corrected parameter is different depending on the correction method m selected by the correction method selection unit 105. Details will be described later.

It should be noted that it is desirable that the parameter determination unit 106 determines a parameter every time obtaining the corrected power amount $x_n$ from the corrected power amount calculation unit 102. However, the parameter determination unit 106 does not have to determine a parameter every time obtaining the corrected power amount $x_n$.

Figure 10:
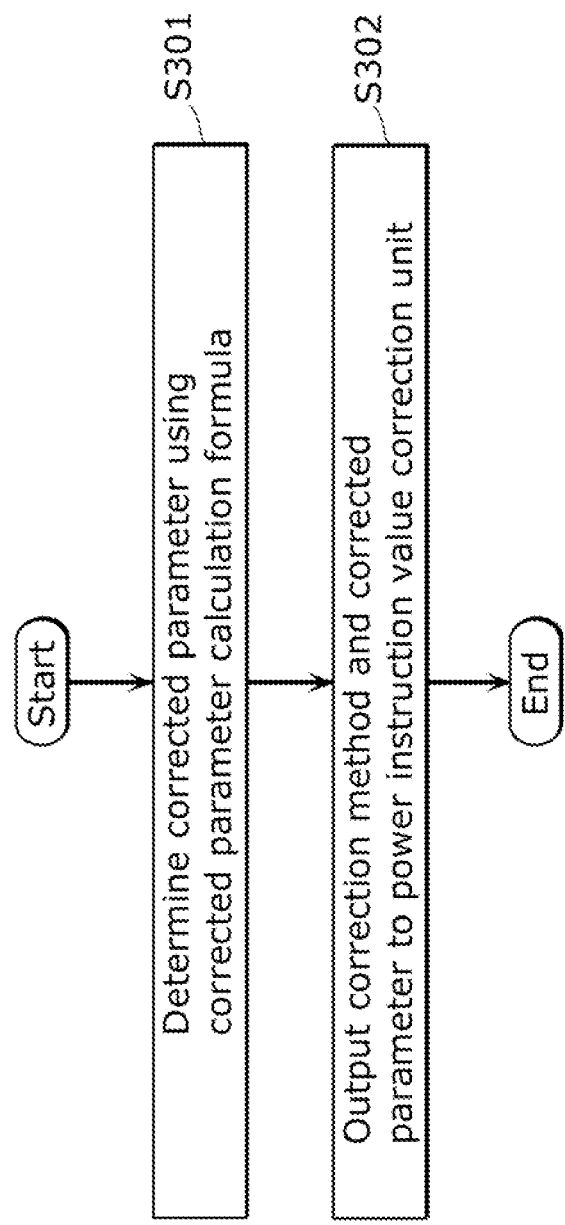
FIG. 10 is a flowchart illustrating an operation of a parameter determination unit.

FIG. 10 is a flowchart illustrating the operation of the parameter determination unit 106.

First, the parameter determination unit 106 determines a corrected parameter using the corrected parameter calculation formula which is a formula using the correction method m and the corrected power amount $x_n$ as an argument (S301), as indicated in Expression (12).

[Math. 10]

$$p_n = f_p(m, x_n) \qquad \text{Expression (12)}$$

Here, $p_n$ denotes a corrected parameter, and $f_p$ denotes a corrected parameter calculation formula.

For example, when the correction method $m = M_1$, the corrected parameter $p_n$ is a delay time. The parameter determination unit 106 determines, for example, the corrected parameter using the following Expression (13), as the corrected parameter calculation formula $f_p$.

[Math. 11]

$$p_n = k_\sigma x_n \qquad \text{Expression (13)}$$

Here, $k_o$ denotes an open loop gain, and is a positive real number. For example, when the corrected parameter $p_n$ is a delay time, Expression (13) indicates that when the corrected power amount is larger, the delay time is longer. It should be noted that the value of $k_o$ is determined by tuning when the design of the charge or discharge control apparatus 100 is made.

It should be noted that when the correction method $m=M_1$, it is possible that a relationship between the corrected power amount $x_n$ and the delay time (corrected parameter $p_n$) is previously stored in the storage unit 104 as a table, and then the parameter determination unit 106 determines the delay time by referring to the table.

Lastly, the parameter determination unit 106 outputs the correction method m and the corrected parameter $p_n$ to the power instruction value correction unit 107 (S302).

Next, the operation of the power instruction value correction unit 107 will be described in detail.

Using the correction method m and the corrected parameter $p_n$, the power instruction value correction unit 107 corrects the power instruction value that the receiving unit 101 obtains from the power instruction apparatus 110, and outputs the corrected instruction value to the power storage apparatus 120.

It is desirable that the power instruction value correction unit 107 generates and outputs the corrected instruction value every time the receiving unit 107 receives the power instruction value. However, the power instruction value correction unit 107 does not have to generate and output the corrected instruction value every time the receiving unit 101 receives the power instruction value.

Figure 11:
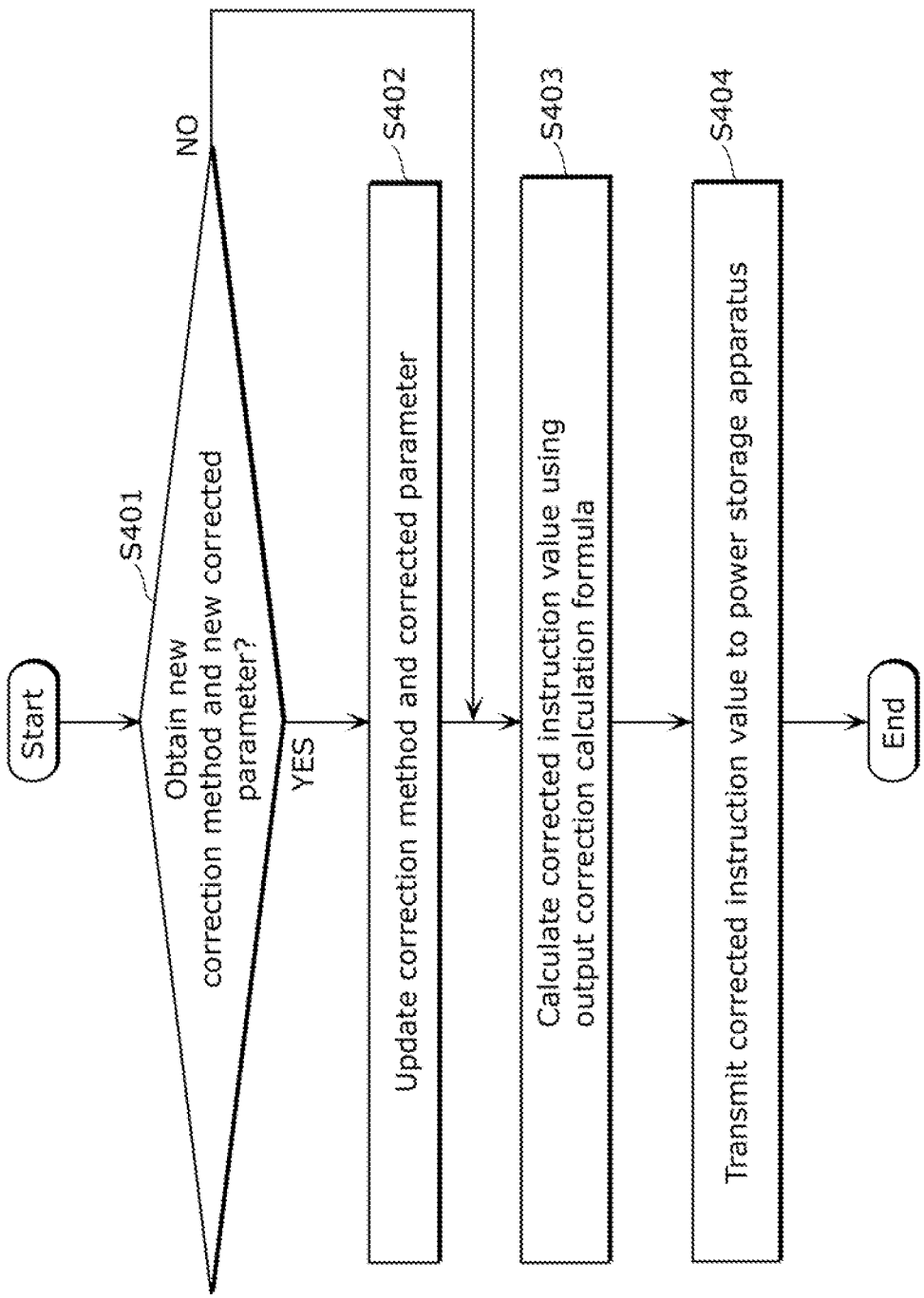
FIG. 11 is a flowchart illustrating an operation of a power instruction value correction unit.

FIG. 11 is a flowchart illustrating the operation of the power instruction value correction unit 107.

First, the power instruction value correction unit 107 obtains the correction method m and the corrected parameter $p_n$ from the parameter determination unit 106 (S401). When the obtained correction method m is a new correction method or when the obtained corrected parameter $p_n$ is a new corrected parameter (Yes in S401), the power instruction value correction unit 107 updates the correction method m or the corrected parameter $p_n$ that is stored as variables in the power instruction value correction unit 107 (S402). When the obtained correction method m and the corrected parameter $p_n$ are not new (No in S401), the power instruction value correction unit 107 does not update the correction method m and the corrected parameter $p_n$, and then moves on to a process of Step S403.

Next, the power instruction value correction unit 107 calculates the corrected instruction value using an output correction calculation formula which is a formula using the correction method m, the corrected parameter $p_n$, and the power instruction value $y_t$ as arguments, as illustrated in Expression (14) (S403).
[Math. 12]

$$y'_t = f_y(m, p_n, y_t)$$ Expression (14)

Here, $y'_t$ denotes the corrected instruction value at time t, and $f_y$ denotes the output correction calculation formula.

Lastly, the power instruction value correction unit 107 transmits the corrected instruction value $y'_t$ to the power storage apparatus 120 (S404).

Next, the first correction method (correction method $M_1$) will be described in detail.

The correction method $M_1$ is selected when $f_{L1}$ illustrated in Expression (9) satisfies a condition of Expression (8), that is, when the weight coefficient $k_1$ of the degree of delay D is smaller than the other weight coefficients.

First, a relationship between the power instruction value and the corrected instruction value when the correction method $M_1$ is used will be described.

Figure 12:
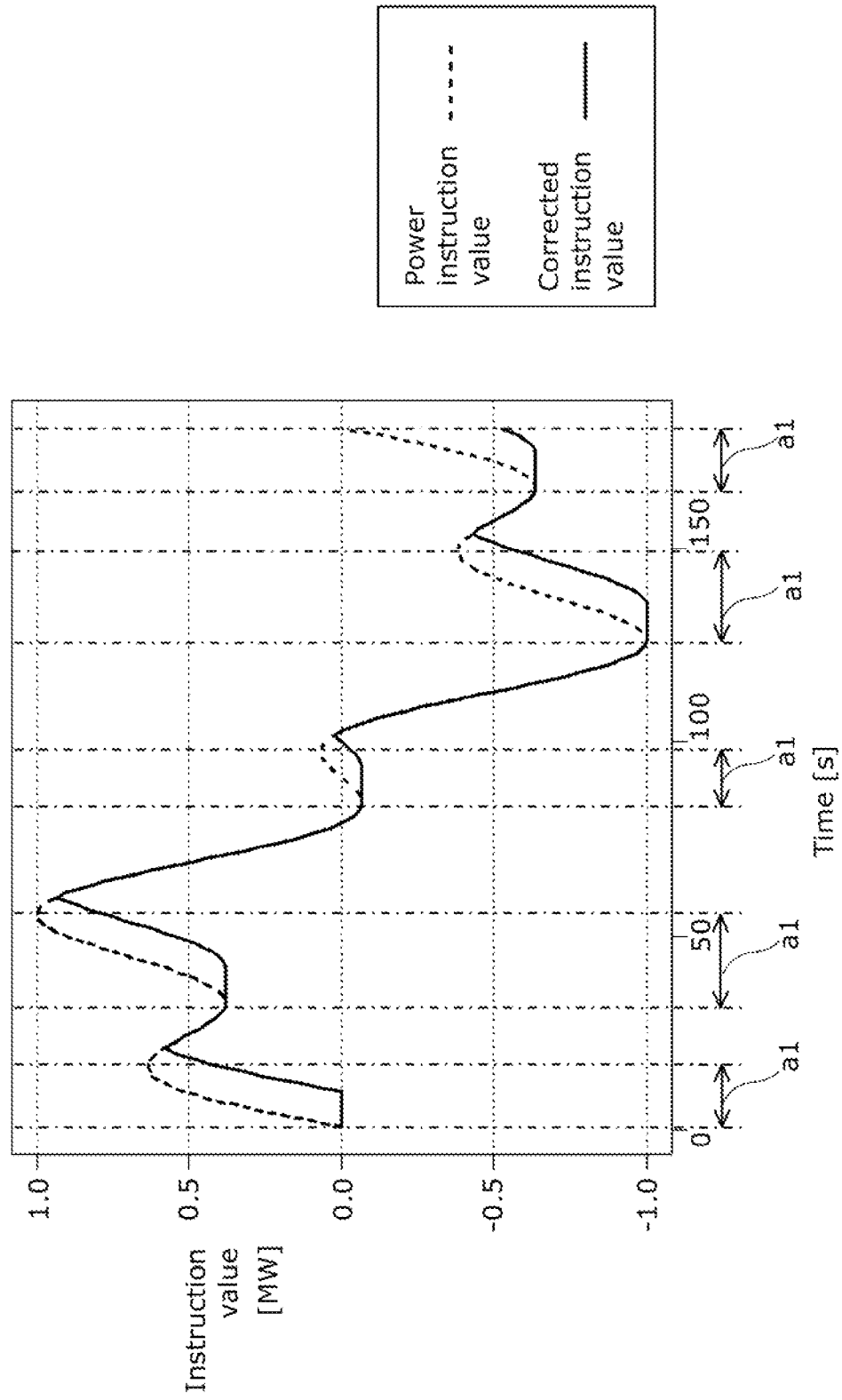
FIG. 12 is a diagram illustrating a relationship between the power instruction value and the corrected instruction value when the corrected power value is a positive value and the first correction method is used.

FIG. 12 is a diagram illustrating a relationship between the power instruction value and the corrected instruction value when the corrected power amount $x_n$ is a positive value and the correction method $M_1$ is used. In FIG. 12, a vertical axis denotes an instruction value, and a horizontal axis denotes time. In FIG. 12, the power instruction value is illustrated in a dashed line, and the corrected instruction value is illustrated in a solid line.

When the corrected power amount $x_n$ is a positive value, that is, when the actual SOC is smaller than the planned SOC, the charge or discharge control apparatus 100 needs to increase the SOC of the power storage apparatus 120. Therefore, in a period in which the power instruction value increases as time passes (period a1 illustrated in FIG. 12), the power instruction value correction unit 107 generates the corrected instruction value to charge or discharge power of a power value indicated by the power instruction value after the passage of the delay time.

Since the period in which the power instruction value increases as time passes represents a period in which the discharge amount of the power storage apparatus 120 increases, discharge is reduced by setting the delay time in this period. Therefore, the charge or discharge control apparatus 100 can reduce a decrease in the SOC of the power storage apparatus 120.

Figure 13:
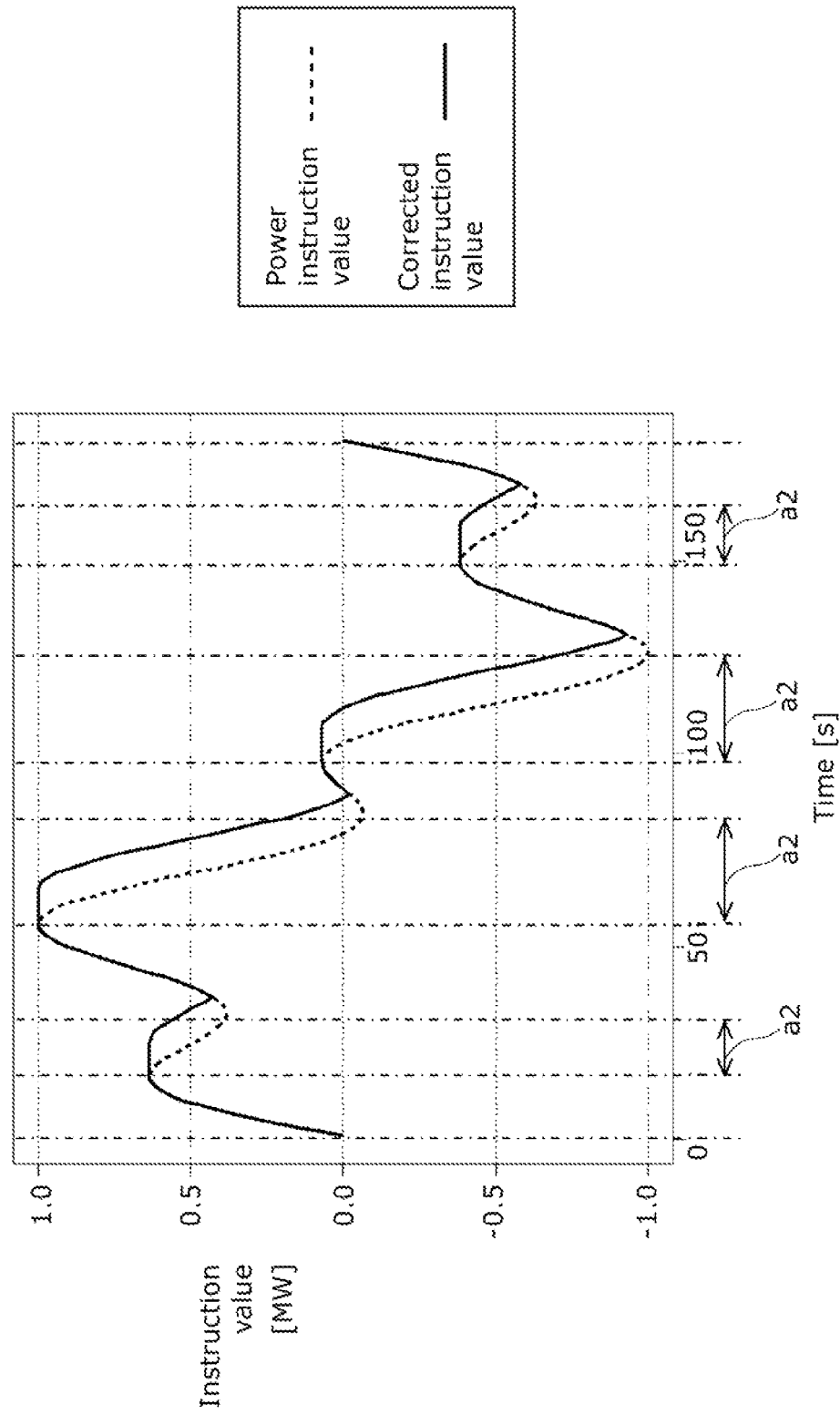
FIG. 13 is a diagram illustrating a relationship between the power instruction value and the corrected instruction value when the corrected power value is a negative value and the first correction method is used.

FIG. 13 is a diagram illustrating a relationship between the power instruction value and the corrected instruction value when the corrected power amount $x_n$ is a negative value and the correction method $M_1$ is used. In FIG. 13, a vertical axis denotes an instruction value, and a horizontal axis denotes time. In FIG. 13, the power instruction value is illustrated in a dashed line, and the corrected instruction value is illustrated in a solid line.

When the corrected power amount $x_n$ is a negative value, that is, when the actual SOC is larger than the planned SOC, the charge or discharge control apparatus 100 needs to decrease the SOC of the power storage apparatus 120. Therefore, in a period in which the power instruction value decreases as time passes (portions between periods a1 illustrated in FIG. 12), the power instruction value correction unit 107 generates the corrected instruction value to charge or discharge power of a power value indicated by the power instruction value after the passage of the delay time.

Since the period in which the power instruction value decreases as time passes represents a period in which the charge amount of the power storage apparatus 120 increases, charge is reduced by setting the delay time in this period. Therefore, the charge or discharge control apparatus 100 can reduce an increase in the SOC of the power storage apparatus 120.

Here, the correction method $M_1$ is selected when the weight coefficient $k_1$ of the degree of delay D is smaller than the other weight coefficients. In other words, as illustrated in FIG. 12 and FIG. 13, even when the delay time is set, an influence on the performance score PS is small. Therefore, the charge or discharge control apparatus 100 can maintain the output quality and control the SOC of the power storage apparatus 120.

The following will describe details of the control the control unit 103 in the case of the correction method M1.

In the correction method $M_1$, the corrected parameter $p_n$ determined by the parameter determination unit 106 is a delay time. As illustrated in the above described Expression (13), the parameter determination unit 106 determines, as the corrected parameter $p_n$, a delay time proportional to the corrected power amount $x_n$. Therefore, when the corrected power amount $x_n$ is a negative value, the delay time is also a negative value.

Moreover, there is a case where in the stabilization control, the upper limit is set for the delay time from when the power instruction value is received until when the power storage apparatus 120 charges and discharges according to the received power instruction value. In this case, the parameter determination unit 106 does not have to calculate the delay time using a linear expression such as Expression (13). The parameter determination unit 106 may calculate the delay time using an expression such as Expression (13') in which the upper limit value is set for the delay time. When the parameter determination unit 106 calculates the delay time using Expression (13'), the delay time is within a predetermined range however large the corrected power amount $x_n$ may be.

[Math. 13]

$$\begin{cases} p_n = \max(k_o x_n, p_{max}) & x_n \geq 0 \\ p_n = \min(k_o x_n, -p_{max}) & x_n < 0 \end{cases} \quad \text{Expression (13')}$$

Here, $p_{max}$ denotes the upper limit value of the delay time.

In the correction method $M_1$, the power instruction value correction unit 107 calculates the corrected instruction value using the output correction calculation formula $f_y$ as illustrated in Expression (15).

[Math. 14]

$$\begin{cases} y'_t = \min(y_t, y_{t-|p_n|}) & p_n \geq 0 \\ y'_t = \max(y_t, y_{t-|p_n|}) & p_n < 0 \end{cases} \quad \text{Expression (15)}$$

Here, min is a function which returns the smallest value in the interval of the argument, and max is a function which returns the largest value in the interval of the argument. For example, when the delay time (corrected parameter $p_n$) is +6 seconds, the smallest power instruction value among from the current power instruction value to the power instruction value 6 seconds before is the corrected instruction value.

With this, when the delay time is a positive value, the corrected instruction value is an instruction value in which time delay is set by the delay time, only in a period in which the power instruction value increases as time passes (when the output increases). Moreover, when the delay time is a negative value, the corrected instruction value is an instruction value in which time delay is set by the delay time, only in a period in which the power instruction value decreases as time passes (when the output decreases).

It should be noted that when $T_d$ represents a delay time of communication and process from the power instruction apparatus 110 to the power storage apparatus 120 and when $T_d$ is considerably large compared with the corrected parameter $p_n$ which indicates the delay time, the delay time of the whole system can be set by subtracting $T_d$ from $p_n$. In other words, the delay time (corrected parameter $p_n$) may include the time ($T_d$) from when the power instruction value is received to when the power storage apparatus 120 starts charging or discharging according to the power instruction value.

Moreover, by subtracting $T_d$ from $p_{max}$, the upper limit value can be set for the delay time of the whole system.

As described above, the charge or discharge control apparatus 100 according to Embodiment 1 makes it possible to correct the power instruction value based on the performance score calculation method. Accordingly, it is possible to maintain the output quality and to control and control the SOC of the power storage apparatus 120.

(Modification 1)

Next, Modification 1 of the charge or discharge control apparatus 100 will be described.

The parameter determination unit 106 of the charge or discharge control apparatus 100 according to Modification 1 obtains the actual corrected power amount in the past predetermined period from the power instruction correction unit 107. Furthermore, the parameter determination unit 106 determines a deviation $e_n$, using the difference between the calculated corrected power amount $x_n$ in the past predetermined period and the actual corrected power amount in the past predetermined period. The parameter determination unit 106 increases the degree of precision of the future corrected power amount by controlling the corrected parameter $p_n$ to get the deviation $e_n$ close to 0.

Specifically, the parameter determination unit 106 calculates the corrected parameter $p_n$ not by using the expression of the open loop control such as Expression (13) but by using Expression (16) of PI control (feedback control) in a discrete-time system.

[Math. 15]

$$p_n = p_{n-1} + K_p(e_n - e_{n-1}) + \Delta t K_i e_n \quad \text{Expression (16)}$$

Here, $p_n$ denotes the corrected parameter $p_n$ in Step n, $e_n$ denotes the deviation (corrected power amount−actual corrected power amount), and $\Delta t$ denotes sampling time, $K_p$ denotes a proportionality coefficient, and $K_i$ denotes an integral coefficient.

According to this configuration, the parameter determination unit 106 can determine the corrected parameter $p_n$ to get the deviation between the corrected power amount $x_n$ of the power storage apparatus 120 and the actual corrected power amount close to 0 in the long term, and can increase the degree of precision of the future corrected power amount.

(Modification 2)

Next, Modification 2 of the charge or discharge control apparatus 100 will be described.

The parameter determination unit 106 of the charge or discharge control apparatus 100 according to Modification 2 dynamically determines, in the above described correction method $M_1$, the delay time (corrected parameter $p_n$) every time receiving the power instruction value using the change amount of the power instruction value.

When the power instruction value rapidly changes even if the same delay time is set, that is, when the change amount of the power instruction value is large, the degree of delay D and the degree of precision P of the performance score tend to degrade. Meanwhile, when the power instruction value slowly changes, that is, when the change amount of the power instruction value is small, the degree of delay D and the degree of precision P of the performance score tend to be difficult to degrade.

Figure 14:
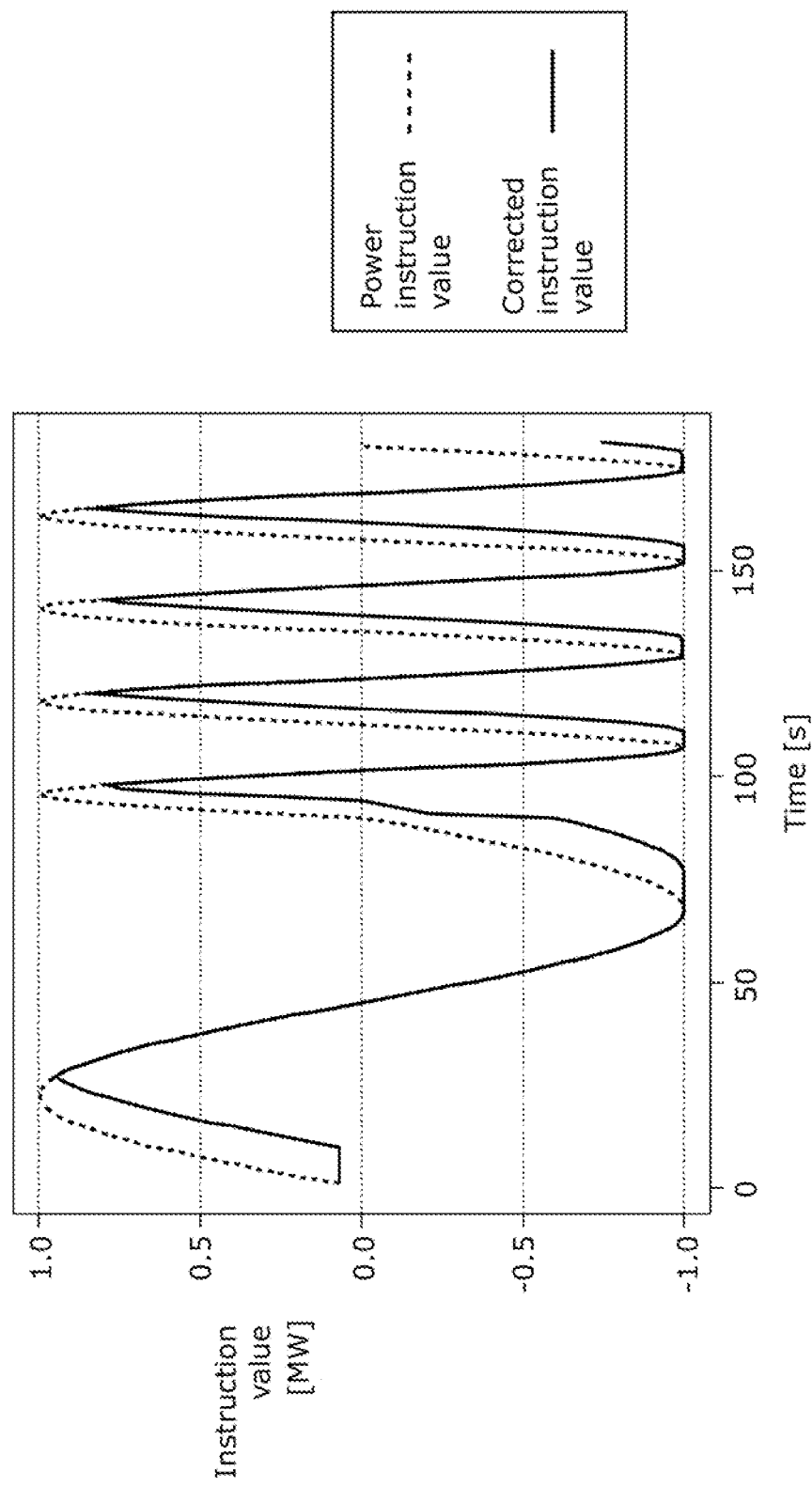
FIG. 14 is a diagram illustrating a relationship between the power instruction value and the corrected instruction value when the corrected power value is a positive value and the first correction method according to Modification 2 is used.

Therefore, the parameter determination unit 106 may calculate the change amount from the latest power instruction value (second power instruction value) of the power instruction value when determining the delay time of the power instruction value (first power instruction value). At this time, the parameter determination unit 106 reduces the delay time when the magnitude of the change amount is large, and increases the delay time when the magnitude of the change amount is small. The corrected instruction value determined in this way and the power instruction value have a relationship as illustrated in FIG. 14 when the corrected power amount $x_n$ is a positive value. In FIG. 14, the delay time is shorter along with the change of the power instruction value when the delay time reaches around time 80 (s).

It should be noted that the above described change amount does not have to be the change amount with respect to the latest power instruction value. The above described change amount may be a change amount with respect to the power instruction value received earlier than the current power instruction value, and may be a change amount with respect to the average of the power instruction values received in a predetermined period before the current power instruction value.

(Modification 3)

Next, Modification 3 of the charge or discharge control apparatus 100 will be described.

In the above described correction method $M_1$, the power instruction value correction unit 107 of the charge or discharge control apparatus 100 according to Modification 3 calculates a predicted instruction value which predicts the future power instruction value using the history of the power instruction value received in the past. Here, the history of the power instruction value received in the past is stored in the storage unit 104 and the like.

When the corrected power amount $x_n$ is a positive value, the power instruction value correction unit 107 generates, in the period in which the predicted instruction value increases as time passes (first period), the corrected instruction value to charge or discharge power of a power value indicated by the predicted instruction value corresponding to the above described power instruction value at a timing after the passage of the delay time from when the power instruction value is received.

When the corrected power amount $x_n$ is a positive value, the power instruction value correction unit 107 generates, in the period in which the predicted instruction value decreases as time passes (second period), the corrected instruction value to charge or discharge power of a power value indicated by the predicted instruction value corresponding to the above described power instruction value at a timing which precedes, by the delay time, from when the power instruction value is received.

Figure 15:
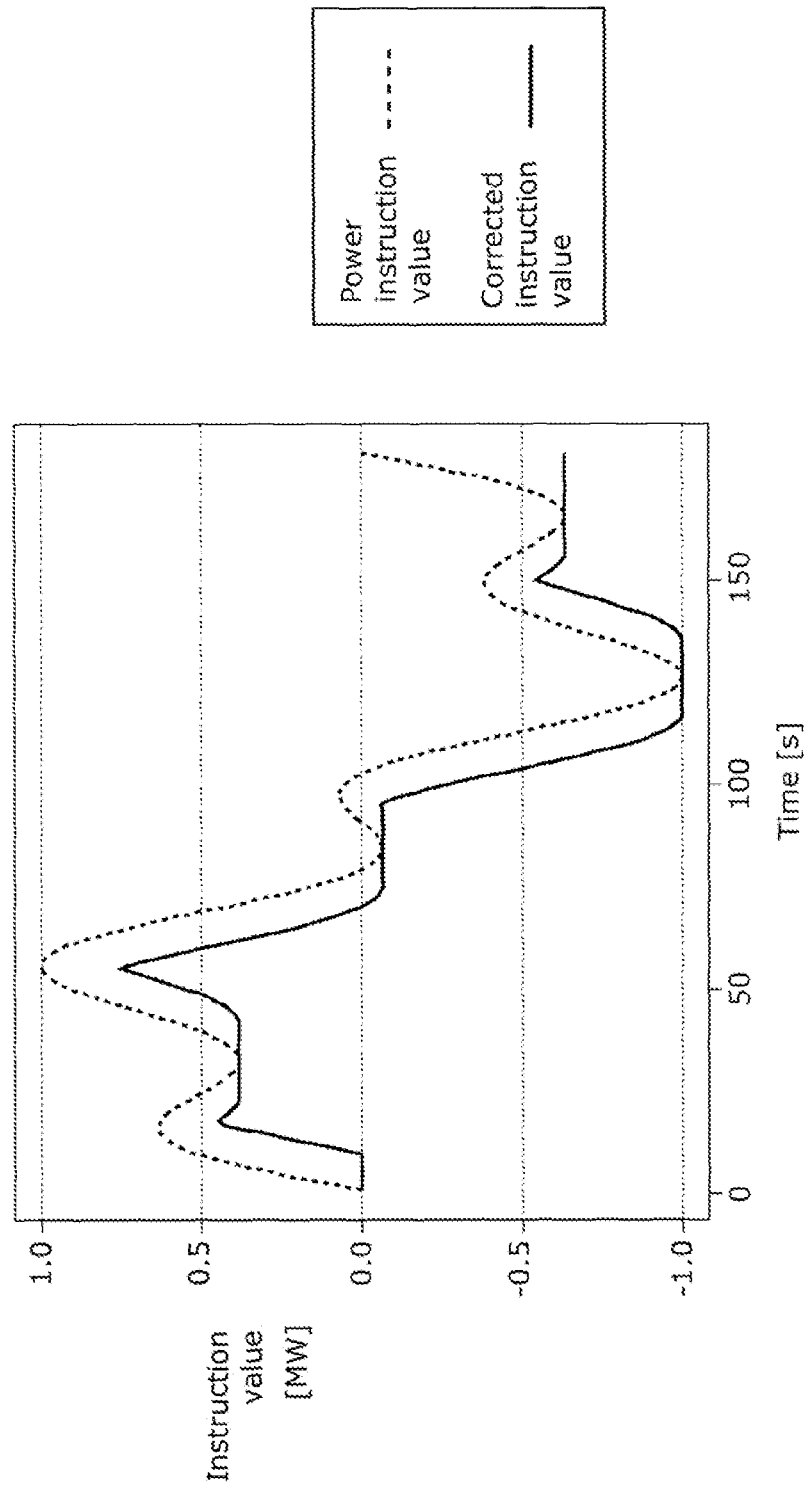
FIG. 15 is a diagram illustrating a relationship between the power instruction value and the corrected instruction value when the corrected power value is a positive value and the first correction method according to Modification 3 is used.

The corrected instruction value determined in this way and the power instruction value have a relationship as illustrated in FIG. 15.

When the corrected power amount $x_n$ is a negative value, the power instruction value correction unit 107 generates, in the period in which the predicted instruction value increases as time passes, the corrected instruction value to charge or discharge power of a power value indicated by the predicted instruction value corresponding to the above described power instruction value at a timing which precedes, by the delay time, from when the power instruction value is received.

When the corrected power amount $x_n$ is a negative value, the power instruction value correction unit 107 generates, in the period in which the predicted instruction value decreases as time passes, the corrected instruction value to charge or discharge power of a power value indicated by the predicted instruction value corresponding to the above described power instruction value at a timing after the passage of the delay time from when the power instruction value is received.

Specifically, the power instruction value correction unit 107 according to Modification 3 generates the corrected instruction value using Expression (15') which is a modification of Expression (15).

[Math. 16]

$$\begin{cases} y'_t = \min(y_{t+|p_n|}, y_{t-|p_n|}) & p_n \geq 0 \\ y'_t = \max(y_{t+|p_n|}, y_{t-|p_n|}) & p_n < 0 \end{cases} \quad \text{Expression (15')}$$

When the corrected power amount $x_n$ is a positive value, the discharge amount is smaller when the corrected instruction value is generated using Expression (15') than when the corrected instruction value is generated using Expression (15). Meanwhile, when the corrected power amount $x_n$ is a negative value, the charge amount is larger. Therefore, the charge or discharge control apparatus 100 according to Modification 3 can control the SOC at a faster rate.

(Embodiment 2)

Embodiment 2 will describe in detail the second correction method (correction method $M_2$).

The correction method $M_2$ is selected when $f_{L2}$ illustrated in Expression (10) satisfies a condition of Expression (8), that is, when the weight coefficient $k_2$ of the degree of correlation A is larger than the other weight coefficients. At this time, the degradation of the performance score can be prevented as much as possible by preventing the degradation of the degree of correlation A as much as possible.

The correction method $M_2$ is a correction method of correcting the power instruction value to the corrected power instruction value obtained by increasing or decreasing the power instruction value mainly in the period in which the power instruction value is around ±0, in order to avoid degrading the degree of correlation A between the power instruction value and the power instruction value actually outputted from the power storage apparatus 120.

Figure 16:
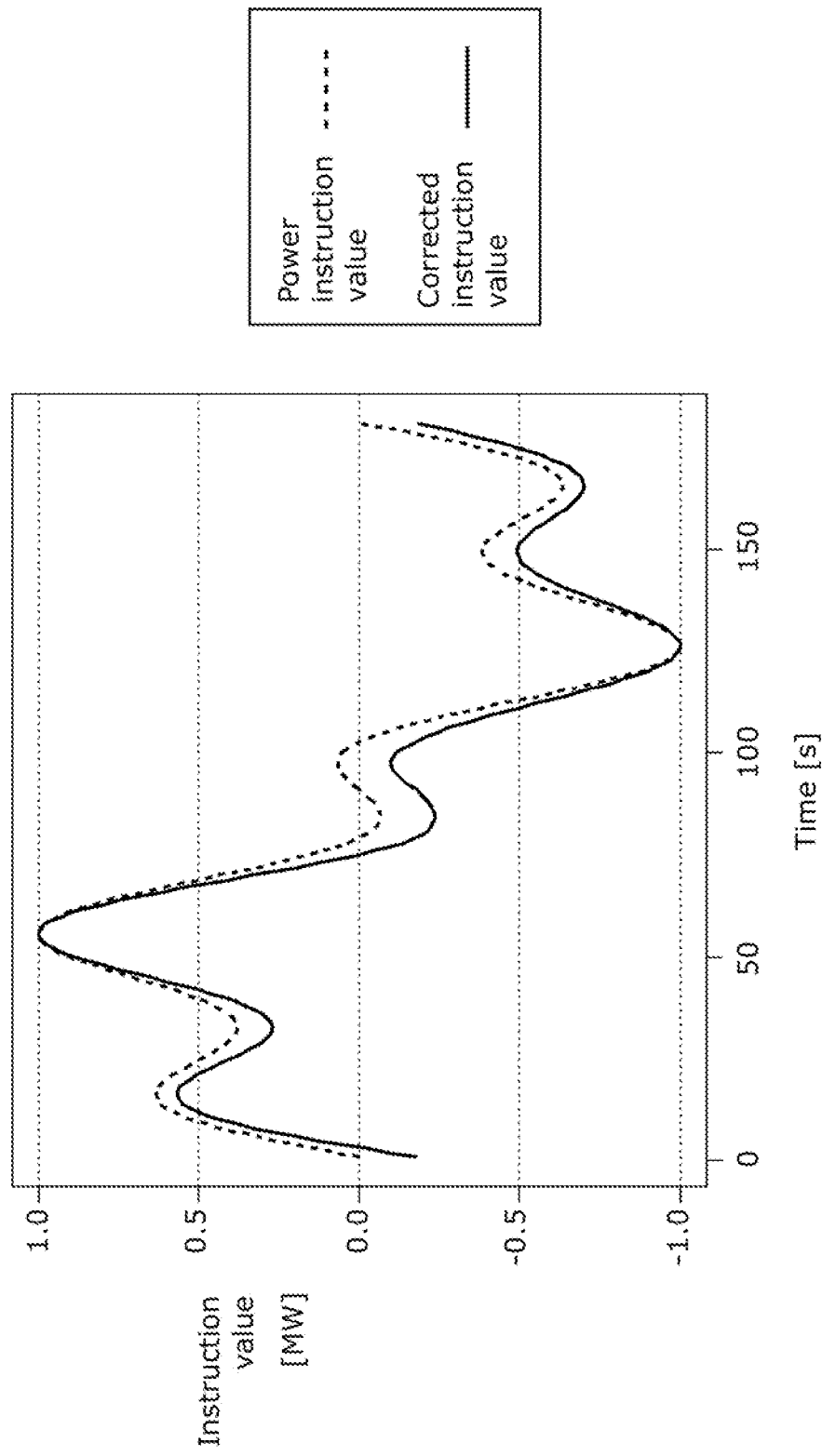
FIG. 16 is a diagram illustrating a relationship between the power instruction value and the corrected instruction value when the corrected power value is a positive value and the second correction method is used.

FIG. 16 is a diagram illustrating a relationship between the power instruction value and the corrected instruction value, when the corrected power amount $x_n$ is a positive value and the correction method $M_2$ is used. In FIG. 16, a vertical axis denotes an instruction value, and a horizontal axis denotes time. In FIG. 16, the power instruction value is illustrated in a dashed line, and the corrected instruction value is illustrated in a solid line.

When the corrected power amount $x_n$ is a positive value, that is, when the actual SOC is smaller than the planned SOC, the charge or discharge control apparatus 100 needs to increase the SOC of the power storage apparatus 120. Therefore, the power instruction value correction unit 107 calculates, as the corrected instruction value, a power value obtained by adding the power value indicating charge (first offset power value) to the power value indicated by the power instruction value. In other words, the first offset power value is a power value having a negative sign.

Here, the power instruction value correction unit 107 determines the first offset power value so that when an absolute value of the power value indicated by the power instruction value is smaller, the absolute value is larger.

In other words, in the correction method $M_2$, the power instruction value correction unit 107 decreases the correction amount of the power instruction value in the period in which the power instruction value is near the upper limit value or the lower limit value, and increases the correction amount of the power instruction value when the power instruction value comes close to ±0. This is because by using this correction method, the degree of correlation A does not degrade very much.

It should be noted that although not illustrated, when the corrected power amount $x_n$ is a negative value, that is, when the actual SOC is larger than the planned SOC, the charge or discharge control apparatus 100 needs to decrease the SOC of the power storage apparatus 120. Therefore, the power instruction value correction unit 107 calculates, as the corrected instruction value, a power value obtained by adding the power value indicating discharge (second offset power value) to the power value indicated by the power instruction value.

In other words, the second offset power value is a power value having a positive sign. Here, the power instruction value correction unit 107 determines the second offset power value so that when an absolute value of the power value indicated by the power instruction value is smaller, the absolute value is larger.

The following will describe details of the control the control unit 103 in the case of the correction method $M_2$.

In the correction method $M_2$, the corrected parameter $p_n$ determined by the parameter determination unit 106 is an increase/decrease coefficient. As illustrated in the above described Expression (13), the parameter determination unit 106 determines, as the corrected parameter $p_n$, the increase/decrease coefficient proportional to the corrected power amount $x_n$.

In the correction method $M_2$, the power instruction value correction unit 107 calculates the corrected power instruction value using the output correction calculation formula $f_y$ as illustrated in Expression (17).

[Math. 17]

$$y'_t = y_t - p_n(1-|y_t|) \qquad \text{Expression (17)}$$

Here, $y_t$ denotes the power instruction value, $p_n$ denotes the increase/decrease coefficient (corrected parameter), and $y'_t$ denotes the corrected instruction value. For example, when the power instruction value $y_t$ is ±1.0, the corrected instruction value $y'_t$ is equal to $y_t$. When $y_t$ is 0.0, the corrected instruction value $y'_t$ is smaller than the power instruction value $y_t$ by the increase/decrease coefficient $p_n$.

As described above, the power instruction value correction unit 107 calculates the corrected instruction value using the output correction calculation formula $f_y$ as illustrated in Expression (17). Accordingly, the corrected instruction value $y'_t$ has characteristics as illustrated in FIG. 16.

According to the above described correction method $M_2$, it is possible to control the SOC of the power storage apparatus 120 while reducing the degradation of the degree of correlation A in the performance score. In other words, the correction method $M_2$ is effective in the stabilization control to which the performance score calculation method which emphasizes the degree of correlation A is applied.

(Embodiment 3)

Embodiment 3 will describe in detail the third correction method (correction method $M_3$).

The correction method $M_3$ is selected when $f_{L3}$ illustrated in Expression (11) satisfies a condition of Expression (8), that is, when the weight coefficient $k_3$ of the degree of precision P is larger than the other weight coefficients. At this time, the degradation of the performance score can be prevented as much as possible by preventing the degradation of the degree of precision P as much as possible.

The correction method $M_3$ is a correction method of stopping charge or discharge of the power storage apparatus 120 at a specific time interval in only one of the period indicated by the power instruction value and the period indicating charge.

Figure 17:
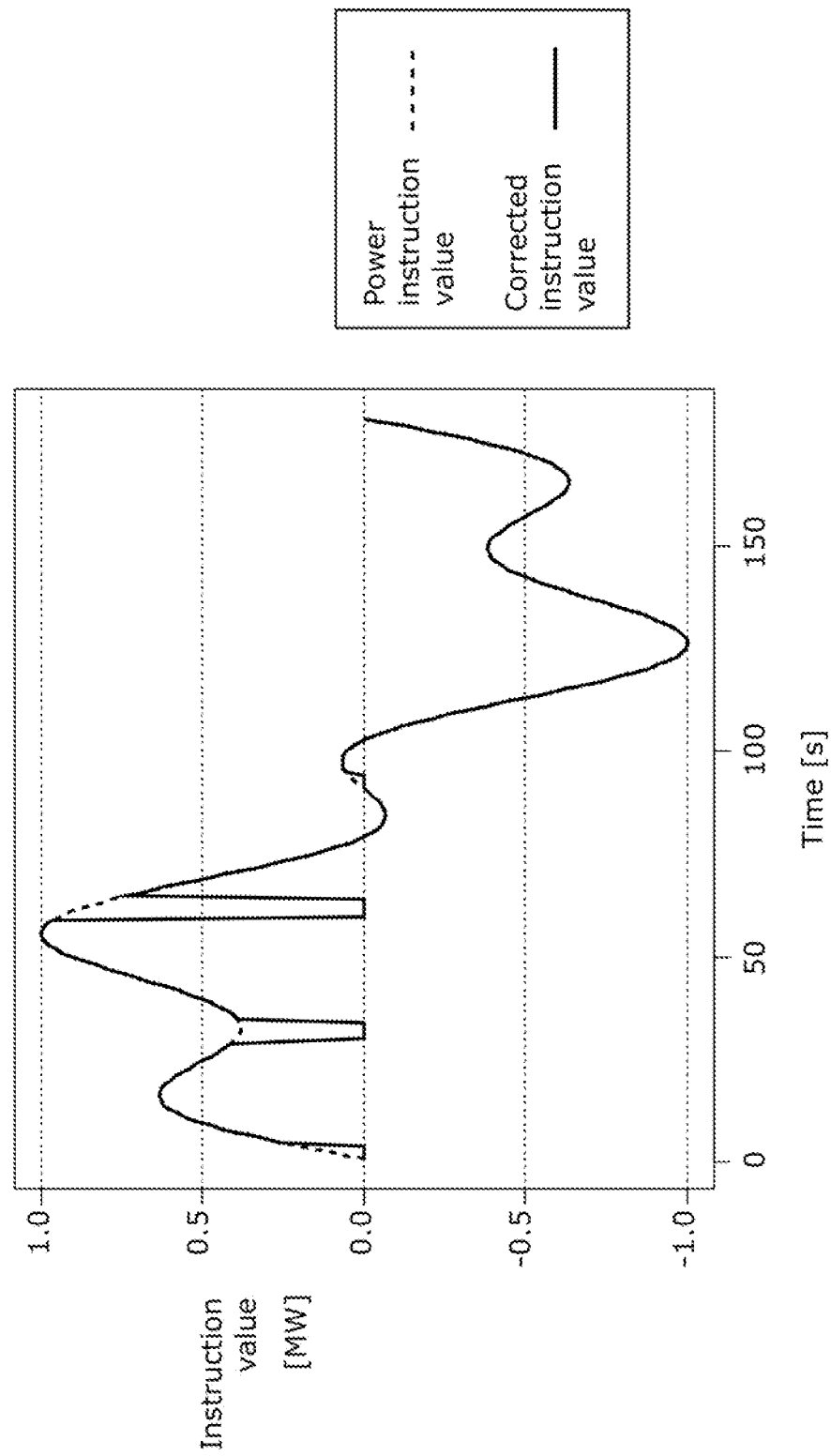
FIG. 17 is a diagram illustrating a relationship between the power instruction value and the corrected instruction value when the corrected power value is a positive value and the third correction method is used.

FIG. 17 is a diagram illustrating a relationship between the power instruction value and the corrected instruction value, when the corrected power amount $x_n$ is a positive value and the correction method $M_3$ is used. In FIG. 17, a vertical axis denotes an instruction value, and a horizontal axis denotes time. In FIG. 17, the power instruction value is illustrated in a dashed line, and the corrected instruction value is illustrated in a solid line.

When the corrected power amount $x_n$ is a positive value, that is, when the actual SOC is smaller than the planned SOC, the charge or discharge control apparatus 100 needs to increase the SOC of the power storage apparatus 120. Therefore, the power instruction value correction unit 107 stops charge or discharge of the power storage apparatus 120 for a predetermined time in every predetermined period in the period in which the power instruction value indicates charge.

In the performance score emphasizing the degree of precision P, it is important that the power instruction value and the power value of power actually outputted from the power storage apparatus 120 match with each other in many periods. Therefore, by minimizing the period in which the power instruction value and the power value of power actually outputted from the power storage apparatus 120 do not match with each other, the degradation of the degree of precision P can be reduced.

It should be noted that although not illustrated, when the corrected power amount $x_n$ is a negative value, that is, when the actual SOC is larger than the planned SOC, the charge or discharge control apparatus 100 needs to decrease the SOC of the power storage apparatus 120. Therefore, the power instruction value correction unit 107 stops charge or discharge of the power storage apparatus 120 for a predetermined time in every predetermined period in the period in which the power instruction value indicates charge.

The following will describe details of the control the control unit 103 in the case of the correction method $M_3$.

In the correction method $M_3$, the corrected parameter $p_n$ determined by the parameter determination unit 106 is predetermined time (reduction time) to stop charge or discharge the power storage apparatus 120.

In the correction method $M_3$, the power instruction value correction unit 107 calculates the corrected power instruction value using the output correction calculation formula $f_y$ as illustrated in Expression (18).

[Math. 18]

$$\begin{cases} y'_t = 0 & p_n > 0 \text{ and } y_t > 0 \text{ and } t \bmod p_{base} < |p_n| \\ \text{or} & p_n < 0 \text{ and } y_t < 0 \text{ and } t \bmod p_{base} < |p_n| \\ y'_t = y_t & \text{other than above cases} \end{cases} \qquad \text{Expression (18)}$$

Here, $y'_t$ denotes a power instruction value, $t$ denotes time, $p_{base}$ denotes a period, $p_n$ denotes reduction time (corrected parameter), $y'_t$ denotes a corrected instruction value, and mod denotes a function to obtain the remainder.

As described above, the power instruction value correction unit 107 calculates the corrected instruction value using the output correction calculation formula $f_y$ as illustrated in Expression (18). Accordingly, the corrected instruction value $y'_t$ has characteristics as illustrated in FIG. 17.

According to the above described correction method $M_3$, it is possible to control the SOC of the power storage apparatus 120 while reducing the degradation of the degree of precision P in the performance score. In other words, the correction method $M_3$ is effective in the stabilization control to which the performance score calculation method which emphasizes the degree of precision P is applied.

(Embodiment 4)

Although Embodiments 1 to 3 describe the correction method $M_1$, the correction method $M_2$, and the correction method $M_3$, respectively, the charge or discharge apparatus 100 may use a correction method other than these.

Embodiment 4 will describe in detail the fourth correction method (correction method $M_4$).

The correction method $M_4$ is a correction method which makes it difficult to degrade the degree of correlation A. Therefore, the correction method $M_4$ is selected when $f_{L2}$ illustrated in Expression (10) satisfies a condition of Expression (8), that is, when the weight coefficient $k_2$ of the degree of correlation A is larger than the other weight coefficients.

The correction method $M_4$ is a correction method of correcting the power instruction value to the corrected power instruction value obtained by increasing or decreasing the power instruction value mainly in the period in which the power instruction value is around the largest value or the smallest value, to avoid degrading the degree of correlation A between the power instruction value and the power instruction value actually outputted by the power storage apparatus 120.

Figure 18:
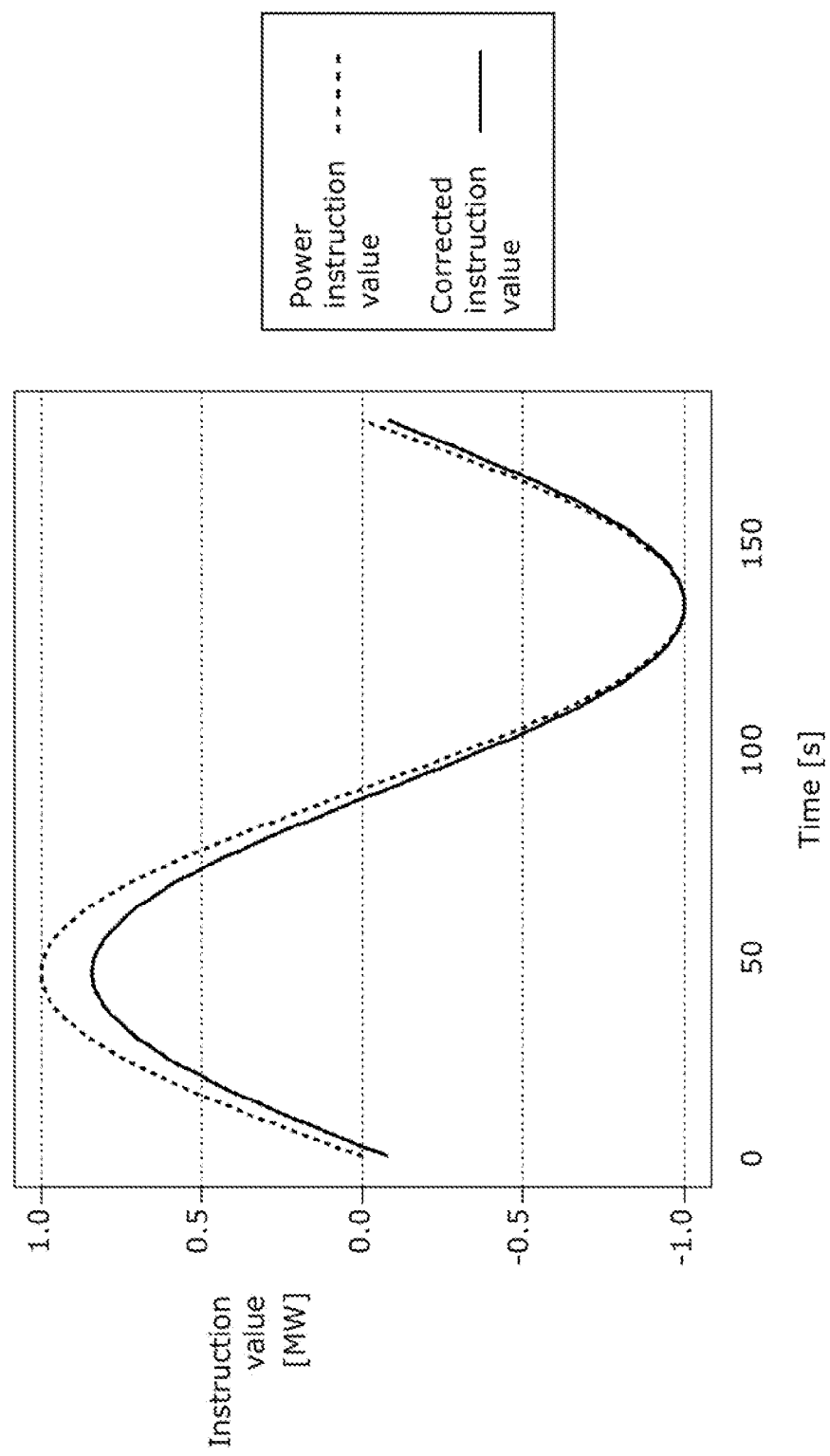
FIG. 18 is a diagram illustrating a relationship between the power instruction value and the corrected instruction value when the corrected power value is a positive value and the fourth correction method is used.

FIG. 18 is a diagram illustrating a relationship between the power instruction value and the corrected instruction value, when the corrected power amount $x_n$ is a positive value and the correction method $M_4$ is used. In FIG. 18, a vertical axis denotes an instruction value, and a horizontal axis denotes time. In FIG. 18, the power instruction value is illustrated in a dashed line, and the corrected instruction value is illustrated in a solid line.

When the corrected power amount $x_n$ is a positive value, that is, when the actual SOC is smaller than the planned SOC, the charge or discharge control apparatus 100 needs to increase the SOC of the power storage apparatus 120. Therefore, the power instruction value correction unit 107 calculates, as the corrected instruction value, a power value obtained by adding the power value indicating charge (first offset power value) to the power value indicated by the power instruction value. In other words, the first offset power value is a power value having a negative sign.

Here, the power instruction value correction unit 107 determines the first offset power value so that when an absolute value of the power value indicated by the power instruction value is larger, the value is smaller (becomes minus).

It should be noted that although not illustrated, when the corrected power amount $x_n$ is a negative value, that is, when the actual SOC is larger than the planned SOC, the charge or discharge control apparatus 100 needs to decrease the SOC of the power storage apparatus 120. Therefore, the power instruction value correction unit 107 calculates, as the corrected instruction value, a power value obtained by adding the power value indicating discharge (second offset power value) to the power value indicated by the power instruction value. In other words, the second offset power value is a power value having a positive sign.

Here, the power instruction value correction unit 107 determines the second offset power value so that when an absolute value of the power value indicated by the power instruction value is smaller, the value is larger (becomes plus).

In other words, in the correction method M4, the power instruction value correction unit 107 increases the correction amount of the power instruction value in the period in which the power instruction value is near the upper limit value or the lower limit value, and decreases the correction amount of the power instruction value when the power instruction value comes close to ±0. This is because by using this correction method, the degree of correlation A is not degraded.

The following will describe details of the control the control unit 103 in the case of the correction method $M_4$.

In the correction method $M_4$, the corrected parameter $p_n$ determined by the parameter determination unit 106 is an increase/decrease coefficient. As illustrated in the above described Expression (13), the parameter determination unit 106 determines, as the corrected parameter $p_n$, the increase/decrease coefficient proportional to the corrected power amount $x_n$.

In the correction method $M_4$, the power instruction value correction unit 107 calculates the corrected instruction value using the output correction calculation formula $f_y$ as illustrated in Expression (19).

[Math. 19]

$$y'_t = (1-|p_n|)y_t - p_n \qquad \text{Expression (19)}$$

Here, $y_t$ denotes the power instruction value, $p_n$ denotes the increase/decrease coefficient (corrected parameter), and $y'_t$ denotes the corrected instruction value.

As described above, the power instruction value correction unit 107 calculates the corrected instruction value using the output correction calculation formula $f_y$ as illustrated in Expression (19). Accordingly, the corrected instruction value $y'_t$ has characteristics as illustrated in FIG. 18.

According to the above described correction method $M_4$, it is possible to control the SOC of the power storage apparatus 120 while reducing the degradation of the degree of correlation A in the performance score. In other words, the correction method $M_4$ is effective in the stabilization control to which the performance score calculation method which emphasizes the degree of correlation A is applied.

(Other Embodiments)

It should be noted that although the charge or discharge control apparatus (charge or discharge control method, and charge or discharge control system) according to embodiments has been described. However, the present invention is not limited only to these embodiments. The following cases are also included in the present invention.

(1) Each of the aforementioned apparatuses can be, specifically, realized by a computer system including a microprocessor, a ROM, a RAM, a hard disk unit, a display unit, a keyboard, a mouse, and so on. A computer program is stored in the RAM or hard disk unit. The respective apparatuses achieve their functions through the microprocessor's operation according to the computer program. Here, the computer program is configured by combining plural instruction codes indicating the instructions for the computer.

(2) A part or all of the constituent elements constituting the respective apparatuses may be configured from a single System LSI (Large-Scale Integration). The System-LSI is a super-multi-function LSI manufactured by integrating constituent units on one chip, and is specifically a computer system configured by including a microprocessor, a ROM, a RAM, and so on. A computer program is stored in the ROM.

The System-LSI achieves its function when the microprocessor loads a program from the ROM to the RAM, and performs an operation such as calculation according to the loaded computer program.

(3) A part or all of the constituent elements constituting the respective apparatuses may be configured as an IC card which can be attached and detached from the respective apparatuses or as a stand-alone module. The IC card or the module is a computer system configured from a microprocessor, a ROM, a RAM, and so on. The IC card or the module may also be included in the aforementioned super-multi-function LSI. The IC card or the module achieves its function through the microprocessor's operation according to the computer program. The IC card of the module may also be implemented to be tamper-resistant.

(4) The present invention may be realized according to the aforementioned method. Moreover, the present invention may be a computer program for realizing the previously illustrated method, using a computer, and may also be a digital signal including the computer program.

Furthermore, the present invention may be realized by storing the computer program or digital signal in a computer readable recording medium such as flexible disc, a hard disk, a CD-ROM, an MO, a DVD, a DVD-ROM, a DVD-RAM, BD (Blu-ray (registered trademark) Disc), and a semiconductor memory. Furthermore, the present invention also includes the digital signal stored in these recording media.

Furthermore, the present invention may also be realized by the transmission of the aforementioned computer program or digital signal via a telecommunication line, a wireless or wired communication line, a network represented by the Internet, a data broadcast, and so on.

The present invention may also be a computer system including a microprocessor and a memory, in which the memory stores the aforementioned computer program and the microprocessor operates according to the computer program.

Furthermore, by transferring the program or the digital signal by recording onto the aforementioned recording media, or by transferring the program or digital signal via the aforementioned network and the like, execution using another independent computer program is also made possible.

(5) It is possible to combine each of the embodiments and the modification.

As described above, the charge or discharge control apparatus according to embodiments has been described. However, the present invention is not limited only to these embodiments. Although only some exemplary embodiments have been described in detail above, those skilled in the art will readily appreciate that various modifications may be made in these exemplary embodiments without materially departing from the principles and spirit of the inventive concept, the scope of which is defined in the appended Claims and their equivalents.

INDUSTRIAL APPLICABILITY

A charge or discharge control apparatus according to the present invention is capable of maintaining the output quality and controlling the SOC of the power storage apparatus. Moreover, the charge or discharge control apparatus is capable of changing the correction method of the power instruction value, based on the calculation method of the performance score which indicates the output quality. Therefore, the charge or discharge control apparatus is applicable to: power stabilization control such as voltage control and supply and demand control of the grid; power storage apparatus control of buildings, condominiums, and general households; and electric storage control of the electric appliances.

REFERENCE SIGNS LIST 11, 12 Graph
100 Charge or discharge control apparatus
101 Receiving unit
102 Corrected power amount calculation unit
103 Control unit
104 Storage unit
105 Correction method selection unit
106 Parameter determination unit
107 Power instruction value correction unit
110 Power instruction apparatus
120 Power storage apparatus
130 Grid

The invention claimed is:

1. A method of controlling a power storage apparatus connected to a grid for power system stabilization control, based on a performance score indicating responsiveness of the charge or discharge to a power instruction value, the method comprising:

receiving, in a period of a stabilization control, a power instruction value indicating a power value which the power storage apparatus is to charge or discharge;

obtaining a remaining state of charge (SOC) of the power storage apparatus; and controlling charge or discharge of the power storage apparatus according to the power instruction value, when the power instruction value is received, wherein the performance score is represented by a weighted sum of each of a degree of delay, a degree of correlation, and a degree of precision, the each of the degree of delay, the degree of correlation, and the degree of precision being between a power value indicated by the power instruction value and a power value of power charged or discharged from the power storage apparatus according to the power instruction value, and wherein the charge or discharge of the power storage apparatus are further controlled based on a weight of the performance score, according to one control method selected from among a first control method, a second control method, and a third control method, wherein in the first control method, a delay time is determined according to a difference between a target SOC and the remaining SOC, the delay time being from when the power instruction value is received to when the power storage apparatus is caused to charge or discharge according to the power instruction value, (i) when the remaining SOC is smaller than the target SOC, the delay time is set, in a period in which the power instruction value increases as time passes, from when the power instruction value is received to when the power storage apparatus is caused to charge or discharge according to the power instruction value, and (ii) when the remaining SOC is larger than the target SOC, the delay time is set, in a period in which the power instruction value decreases as time passes, from when the power instruction value is received to when the power storage apparatus is caused to charge or discharge according to the power instruction value, in the second control method,
an offset is added to the power instruction value according to a difference between the target SOC and the remaining SOC, and
(i) when the remaining SOC is smaller than the target SOC, the offset gets larger as an absolute value of a charge power value indicated by the power instruction value becomes smaller, and (ii) when the remaining SOC is larger than the target SOC, the offset gets larger as an absolute value of a discharge power value indicated by the power instruction value becomes smaller, and in the third control method,
a stop time is determined according to a difference between the target SOC and the remaining SOC, (i) stopping charge or discharge of the power storage apparatus for the stop time in a predetermined period, when the remaining SOC is smaller than the target SOC, in a period in which the power instruction value indicates discharge, and (ii) stopping charge or discharge of the power storage apparatus for the stop time in the predetermined period, when the remaining SOC is larger than the target SOC, in a period in which the power instruction value indicates charge.

2. An apparatus for providing a power system stabilization control by controlling a power storage apparatus connected to a grid, the apparatus comprising,
a communication interface that receives a power instruction value indicating a power value which the power storage apparatus is to charge or discharge for setting a frequency of the grid within a predetermined range;
a controller that controls charge or discharge of the power storage apparatus according to the power instruction value, when the power instruction value is received in the communication interface,
wherein the controller obtains a remaining state of charge (SOC) of the power storage apparatus and controls, based on a weight of a performance score, charge or discharge of the power storage apparatus according to one control method selected from among a first control method, a second control method, and a third control method, wherein the performance score is represented by a weighted sum of each of a degree of delay, a degree of correlation, and a degree of precision, the each of the degree of delay, the degree of correlation, and the degree of precision being between a power value indicated by the power instruction value and a power value of power charged or discharged from the power storage apparatus according to the power instruction value,
in a case where the first control method is selected, the controller sets a delay time from when the power instruction value is received to when the power storage apparatus charges or discharges according to the power instruction value, (i) in case the remaining SOC is smaller than a target SOC, in a period in which the power instruction value increases as time passes, and (ii) in case the remaining SOC is larger than the target SOC, in a period in which the power instruction value decreases as time passes,
in a case where the second control method is selected, the controller adds an offset to the power instruction value according to a difference between the target SOC and the remaining SOC, (i) makes the offset larger, when the remaining SOC is smaller than the target SOC, as an absolute value of a charge power value indicated by the power instruction value becomes smaller, and (ii) makes the offset larger, when the remaining SOC is larger than the target SOC, as an absolute value of a discharge power value indicated by the power instruction value becomes smaller, and
in a case where the third control method is selected, the controller determines a stop time according to a difference between the target SOC and the remaining SOC, (i) to stop charge or discharge of the power storage apparatus for the stop time in a predetermined period, when the remaining SOC is smaller than the target SOC, in a period in which the power instruction value indicates discharge, and (ii) to stop charge or discharge of the power storage apparatus for the stop time in the predetermined period, when the remaining SOC is larger than the target SOC, in a period in which the power instruction value indicates charge.

* * * * *